(12) United States Patent
Todd

(10) Patent No.: US 12,718,844 B2
(45) Date of Patent: Aug. 25, 2026

(54) RETRIEVAL ASSEMBLY WITH INTEGRATED LATCH DEACTIVATOR FOR USE WITHIN MEDIA LIBRARY

(71) Applicant: Quantum Corporation, San Jose, CA (US)

(72) Inventor: Christian A. Todd, Parker, CO (US)

(73) Assignee: Quantum Corporation, Centennial, CO (US)

(*) Notice: Subject to any disclaimer, the term of this patent is extended or adjusted under 35 U.S.C. 154(b) by 0 days.

(21) Appl. No.: 18/796,049

(22) Filed: Aug. 6, 2024

(65) Prior Publication Data

US 2026/0045275 A1 Feb. 12, 2026

(51) Int. Cl.
*G11B 15/68* (2006.01)

(52) U.S. Cl.
CPC ........ *G11B 15/6835* (2013.01); *G11B 15/681* (2013.01); *G11B 15/6815* (2013.01); *G11B 15/683* (2013.01)

(58) Field of Classification Search
None
See application file for complete search history.

(56) References Cited

U.S. PATENT DOCUMENTS 5,430,588 A * 7/1995 Rasmussen .......... G11B 15/675 360/92.1
2011/0131782 A1* 6/2011 Suzuki et al. ..... G11B 15/6835 29/426.1
2012/0212117 A1* 8/2012 Ishiyama ........... G11B 15/6835 312/298
2015/0117992 A1* 4/2015 Nagasawa .......... G11B 15/6835 414/280

* cited by examiner

*Primary Examiner* — Craig A. Renner
(74) *Attorney, Agent, or Firm* — Haris Z. Bajwa

(57) ABSTRACT

A media library includes a media cartridge, a storage slot that selectively receives and retains the media cartridge, and a picker system. The storage slot includes a latch configured to securely retain the media cartridge within the storage slot. The picker system is configured to selectively retrieve the media cartridge from within the storage slot. The picker system includes a first picker finger, an opposed second picker finger, and a latch deactivator configured to selectively move the latch from an activated position in which the latch inhibits the media cartridge from being removed from the storage slot, to a deactivated position in which the latch does not inhibit the media cartridge from being removed from the storage slot. The latch deactivator is coupled to the first picker finger such that movement of the first picker finger results in corresponding movement of the latch deactivator.

20 Claims, 17 Drawing Sheets

RETRIEVAL ASSEMBLY WITH INTEGRATED LATCH DEACTIVATOR FOR USE WITHIN MEDIA LIBRARY

BACKGROUND

Automated media library systems (or "media libraries"), such as automated tape library systems (or "tape libraries"), are commonly utilized for purposes of writing data to and reading data from media cartridges, such as magnetic tape cartridges. Magnetic tape cartridges are configured to retain and/or store magnetic tape that can be used in a magnetic tape drive for purposes of writing data to and reading data from the magnetic tape. Magnetic tape cartridges have been used extensively because they provide a convenient way to house and support a length of magnetic tape for engagement by a transducer (or tape head, sometimes referred to as a "head") in the tape drive while protecting the magnetic tape upon removal of the tape cartridge. Moreover, magnetic tape cartridges facilitate economic and compact storage of data. During use of the magnetic tape drive, a tape head of the magnetic tape drive is configured to be in direct contact with the magnetic tape from the magnetic tape cartridge so that data can be written to and read from the magnetic tape as the magnetic tape moves across the tape head, often at high speed. Such tape heads can include dedicated write heads, dedicated read heads, or combination read/write heads.

The magnetic tape cartridges are received and retained (and stored) within storage slots of the tape library when not being used for purposes of writing data to and/or reading data from the magnetic tape. In various embodiments, the tape library can include a plurality of storage slots that are incorporated within one or more magazines. When it is desired to perform a write operation and/or a read operation on the magnetic tape within a given tape cartridge, such as upon request of a user or host application, a tape cartridge retrieval assembly (also referred to herein as a "retrieval assembly") of the tape library is usable to retrieve the tape cartridge and move the tape cartridge between the storage slot and a tape drive of the tape library. In many embodiments, the retrieval assembly includes a picker system having a pair of picker fingers that are configured to selectively grasp the tape cartridge for purposes of moving the tape cartridge between the storage slot and the tape drive. Upon completion of the desired write operation and/or read operation, the retrieval assembly and/or the picker system can then return the tape cartridge to an appropriate storage slot.

In recent years, tape libraries have been modified in design to include latches so that the tape cartridges can be retained more securely within a corresponding storage slot of a given magazine of the tape library. However, the introduction of latches has created an additional requirement on the retrieval assembly and/or the picker system, specifically the need for providing a means to deactivate the latch prior to accessing the tape cartridge from within the corresponding storage slot. The need to release the latch requires additional time, thereby reducing the number of exchanges that can be made per hour by the retrieval assembly, as well as increasing wear on the mechanisms of the retrieval assembly and/or the picker system.

SUMMARY

The present invention is directed toward a media library including a media cartridge, a storage slot, and a picker system. The storage slot is configured to selectively receive and retain the media cartridge. The storage slot includes a latch that is configured to securely retain the media cartridge within the storage slot. The picker system is configured to selectively retrieve the media cartridge from within the storage slot. In various embodiments, the picker system includes a first picker finger, an opposed second picker finger, and a latch deactivator that is configured to selectively move the latch from an activated position in which the latch inhibits the media cartridge from being removed from the storage slot, to a deactivated position in which the latch does not inhibit the media cartridge from being removed from the storage slot. The latch deactivator is coupled to the first picker finger such that movement of the first picker finger results in corresponding movement of the latch deactivator.

In some embodiments, the latch deactivator is integrally formed with the first picker finger.

In certain embodiments, the latch deactivator is coupled to the first picker finger such that movement of the first picker finger in a first direction results in corresponding movement of the latch deactivator in the first direction.

In many embodiments, the media cartridge includes a first side and an opposed second side.

In various embodiments, the first picker finger has a first engaging tip that is configured to selectively engage the first side of the media cartridge; and the second picker finger has a second engaging tip that is configured to selectively engage the second side of the media cartridge.

In many embodiments, the picker fingers are movable between an open position in which the picker fingers do not engage the sides of the media cartridge, and an engaged position in which the picker fingers do engage the sides of the media cartridge.

In various embodiments, the latch deactivator is configured to move the latch from the activated position to the deactivated position simultaneously as the picker fingers are moved from the open position to the engaged position.

In some embodiments, the first side of the media cartridge includes a first engagement recess; and the second side of the media cartridge includes a second engagement recess.

In many embodiments, the media library further includes a reach carriage, the picker fingers being coupled to the reach carriage. The reach carriage and the picker fingers are selectively movable relative to the media cartridge between a retracted position, a first extended position and a second extended position.

In some embodiments, the reach carriage does not move relative to the media cartridge as the picker fingers are moved from the open position to the engaged position and as the latch is moved by the latch deactivator from the activated position to the deactivated position.

In certain embodiments, the first engaging tip engages the first engagement recess and the second engaging tip engages the second engagement recess when the picker fingers are in the engaged position.

In some embodiments, the first picker finger includes a first base section that extends substantially parallel to a rear of the media cartridge when the picker system is being utilized to selectively retrieve the media cartridge from within the storage slot, the first base section including a first segment and a second segment that are at different heights relative to the storage slot, and a stepped segment that is coupled to and extends between the first segment and the second segment.

In certain embodiments, the first segment and the second segment are configured to extend substantially horizontally;

and the stepped segment extends substantially vertically between the first segment and the second segment.

In some embodiments, the latch deactivator is coupled to the first segment.

In certain embodiments, the first picker finger further includes a first intermediate section that is coupled to the second segment, and a first engaging tip that is coupled to the first intermediate section, the first engaging tip being configured to selectively engage a first side of the media cartridge.

In some embodiments, the second picker finger includes (i) a second base section that extends substantially parallel to the rear of the media cartridge when the picker system is being utilized to selectively retrieve the media cartridge from within the storage slot, (ii) a second intermediate section that is coupled to a distal end of the second base section, and (iii) a second engaging tip that is coupled to the second intermediate section, the second engaging tip being configured to selectively engage a second side of the media cartridge.

In certain embodiments, the first segment of the first base section of the first picker finger is movingly coupled to a first portion of a rotating gear; and the second base section of the second picker finger is movingly coupled to a second portion of the rotating gear.

In some embodiments, rotation of the rotating gear causes the first picker finger to move in a first direction, and simultaneously causes the second picker finger to move in a second direction that is opposite to the first direction.

In certain embodiments, the picker system further includes a finger motor that is coupled to the rotating gear, the finger motor being configured to rotate the rotating gear so that the picker fingers move between an open position in which the picker fingers do not engage the sides of the media cartridge, and an engaged position in which the picker fingers do engage the sides of the media cartridge.

In some embodiments, the finger motor is coupled to and rotates a first beveled gear; the first beveled gear engages a second beveled gear such that rotation of the first beveled gear causes a corresponding rotation of the second beveled gear; and the second beveled gear is coupled to the rotating gear such that rotation of the second beveled gear causes rotation of the rotating gear.

The present invention is further directed toward a media library including a media cartridge including a first side, and an opposed second side; a storage slot that is configured to selectively receive and retain the media cartridge, the storage slot including a latch that is movable between an activated position in which the latch inhibits the media cartridge from being removed from the storage slot, and a deactivated position in which the latch does not inhibit the media cartridge from being removed from the storage slot; and a picker system that is configured to selectively retrieve the media cartridge from within the storage slot, the picker system including (i) a first picker finger having a first engaging tip that is configured to selectively engage the first side of the media cartridge, (ii) an opposed second picker finger having a second engaging tip that is configured to selectively engage the second side of the media cartridge, the picker fingers being movable between an open position in which the picker fingers do not engage the sides of the media cartridge, and an engaged position in which the picker fingers do engage the sides of the media cartridge, and (iii) a latch deactivator that is integrally formed with the first picker finger, the latch deactivator being configured to move the latch from the activated position to the deactivated position simultaneously as the picker fingers are moved from the open position to the engaged position.

In certain implementations, the present invention is also directed toward a media library including (A) a media cartridge including a first side, and an opposed second side; (B) a storage slot that is configured to selectively receive and retain the media cartridge, the storage slot including a latch that is movable between an activated position in which the latch inhibits the media cartridge from being removed from the storage slot, and a deactivated position in which the latch does not inhibit the media cartridge from being removed from the storage slot; and (C) a picker system that is configured to selectively retrieve the media cartridge from within the storage slot, the picker system including (i) a first picker finger including a first base section that extends substantially parallel to a rear of the media cartridge when the picker system is being utilized to selectively retrieve the media cartridge from within the storage slot, the first base section including a first segment and a second segment that are at different heights relative to the storage slot, and a stepped segment that is coupled to and extends between the first segment and the second segment, a first intermediate section that is coupled to the second segment, and a first engaging tip that is coupled to the first intermediate section, the first engaging tip being configured to selectively engage a first side of the media cartridge; (ii) an opposed second picker finger including a second base section that extends substantially parallel to the rear of the media cartridge when the picker system is being utilized to selectively retrieve the media cartridge from within the storage slot, a second intermediate section that is coupled to a distal end of the second base section, and a second engaging tip that is coupled to the second intermediate section, the second engaging tip being configured to selectively engage a second side of the media cartridge, the picker fingers being movable between an open position in which the picker fingers do not engage the sides of the media cartridge, and an engaged position in which the picker fingers do engage the sides of the media cartridge; and (iii) a latch deactivator that is integrally formed with the first picker finger, the latch deactivator being configured to move the latch from the activated position to the deactivated position simultaneously as the picker fingers are moved from the open position to the engaged position; wherein the first segment of the first base section of the first picker finger is movingly coupled to a first portion of a rotating gear; wherein the second base section of the second picker finger is movingly coupled to a second portion of the rotating gear; and wherein rotation of the rotating gear causes the picker fingers to move between the open position and the engaged position.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a system and method in which a media library, such as a tape library, includes a retrieval assembly and/or a picker system that is able to deactivate a latch of a specific storage slot in order to access a media cartridge, such as a tape cartridge, retained therein in a more coordinated manner that is more time-efficient than was previously possible. More particularly, the present invention includes a retrieval assembly and/or a picker system with an integrated latch deactivator for use within the media library in order to provide the desired capabilities.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar reference indicators will be used throughout the drawings and the following detailed description to refer to the same or like parts.

In the interest of clarity, not all of the routine features of the implementations described herein are shown and described. It will, of course, be appreciated that in the development of any such actual implementations, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
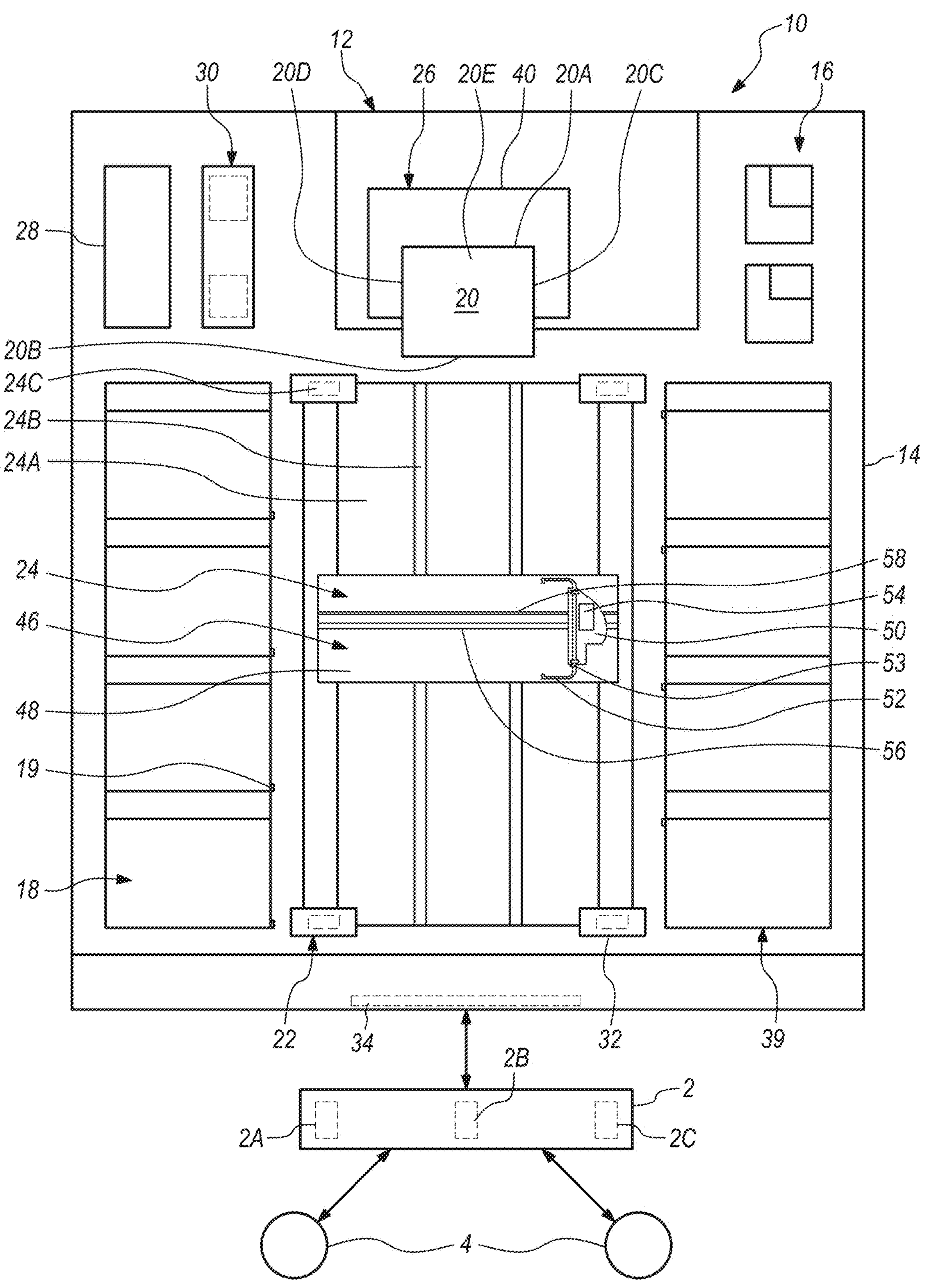
FIG. 1 is a simplified schematic top view illustration of an embodiment of a media library having features of the present invention, the media library including a retrieval assembly that includes a picker system usable for accessing and moving media cartridges within the media library.

FIG. 1 is a simplified schematic top view illustration of one or more hosts 2 (only one is illustrated in FIG. 1), one or more users 4 (two are illustrated in FIG. 1), and an embodiment of an automated media library system 10 (also referred to herein simply as a "media library") having features of the present invention.

As illustrated, the one or more hosts 2 provide a means of access to the media library 10 for the one or more users 4. For example, during operation, the one or more users 4 can issue requests or instructions to the media library 10 that are forwarded via the one or more hosts 2. The one or more hosts 2 can include host firmware 2A (illustrated as a box in phantom), host hardware 2B (illustrated as a box in phantom) and host software 2C (illustrated as a box in phantom)

for purposes of forwarding user requests to the media library 10 and/or for performing any other functions of the one or more hosts 2.

As illustrated, the media library 10 includes a media drive system 12 that includes one or more media drives 26 that are usable for writing data to and reading data from storage media (not shown) that is retained within a media cartridge 20. In various embodiments, the media library 10 can be a tape library that includes a tape drive system including one or more tape drives that are usable for writing data to and reading data from magnetic tape that is retained within a tape cartridge. However, it is understood that the present invention is equally applicable for use with any other suitable types of media libraries using other types of storage media, such as optical disks, magnetic disk drives, emulated or virtual tape drives, etc., as non-exclusive examples.

In FIG. 1, a top cover (not shown) has been omitted for clarity so that the interior of the media library 10 is visible. The design of the media library 10 can be varied as desired. In particular, the media library 10 can have any suitable design that is capable of storing a plurality of media cartridges 20 and using one or more media drives 26 to write data to and read data from the plurality of media cartridges 20. More specifically, it is noted that the media library 10 illustrated in FIG. 1 is just one non-exclusive example of a media library 10 usable with the present invention, and no limitations are intended based on the specific type and/or size of the media library 10 shown in FIG. 1.

In various embodiments, as illustrated in FIG. 1, the media library 10 can include one or more of: (i) a library housing 14 that defines a library interior 16, (ii) a plurality of storage slots 18 that are each configured to receive and selectively retain (and store) a media cartridge 20, each of the plurality of storage slots 18 including a latch 19 so that the media cartridges 20 can be retained more securely within a corresponding storage slot 18, (iii) a rack assembly 22 including one or more racks 32, (iv) a media cartridge retrieval assembly 24 (also referred to herein as a "retrieval assembly"), (v) the media drive system 12 including the one or more media drives 26, (vi) a power supply 28, (vii) a library control system 30, and (viii) a graphical user interface 34 (illustrated in phantom, and also sometimes referred to herein as a "GUI"). Alternatively, the media library 10 can include more components or fewer components than are specifically shown in FIG. 1.

As an overview, in various embodiments, the present invention is directed toward the retrieval assembly 24 including a picker system 46 that enables quick and easy deactivation of the latch 19 of the storage slot 18 so as to provide ready access to the media cartridge 20 that is being retained within the storage slot 18. More particularly, in many embodiments, the picker system 46 includes (i) a picker base 48, (ii) a pair of picker fingers 52 that are movably coupled to the picker base 48 and that are configured to selectively grasp the media cartridge 20, and (iii) a latch deactivator 53 that is coupled to, secured to, and/or integrally formed with one of the picker fingers 52 such that movement of the picker finger 52 results in corresponding and/or simultaneous movement of the latch deactivator 53.

During use of the media library 10, the retrieval assembly 24, such as upon request of a user 4 or host 2, can be moved toward a particular storage slot 18 for purposes of retrieving a media cartridge 20 therefrom, such as during a process of performing a designated or requested read/write operation. Once the retrieval assembly 24 is appropriately positioned generally adjacent to the particular storage slot 18, the picker fingers 52 can be moved relative to the picker base 48 from a retracted position 360A (illustrated in FIG. 3A), where the picker fingers 52 are not positioned near the particular storage slot 18, to a first extended position 360B (illustrated in FIG. 3B), where the picker fingers 52 are positioned near the particular storage slot 18 but cannot yet grasp the media cartridge 20 retained within the particular storage slot 18.

Figure 3A:
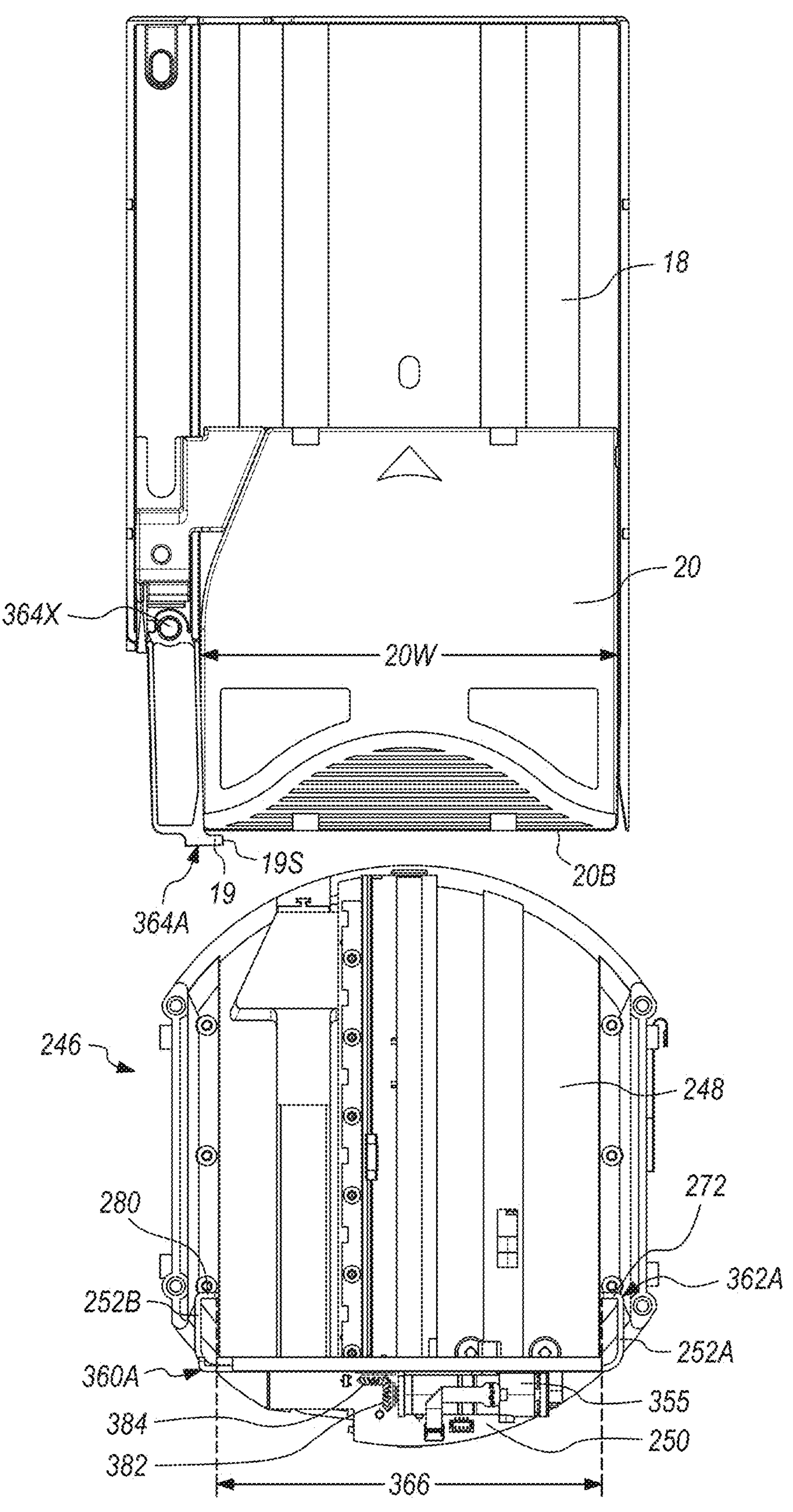
FIG. 3A is a simplified top view illustration of a first step of the picker system of FIG. 2 being used to access and remove a media cartridge from a storage slot of the media library.
Figure 3B:
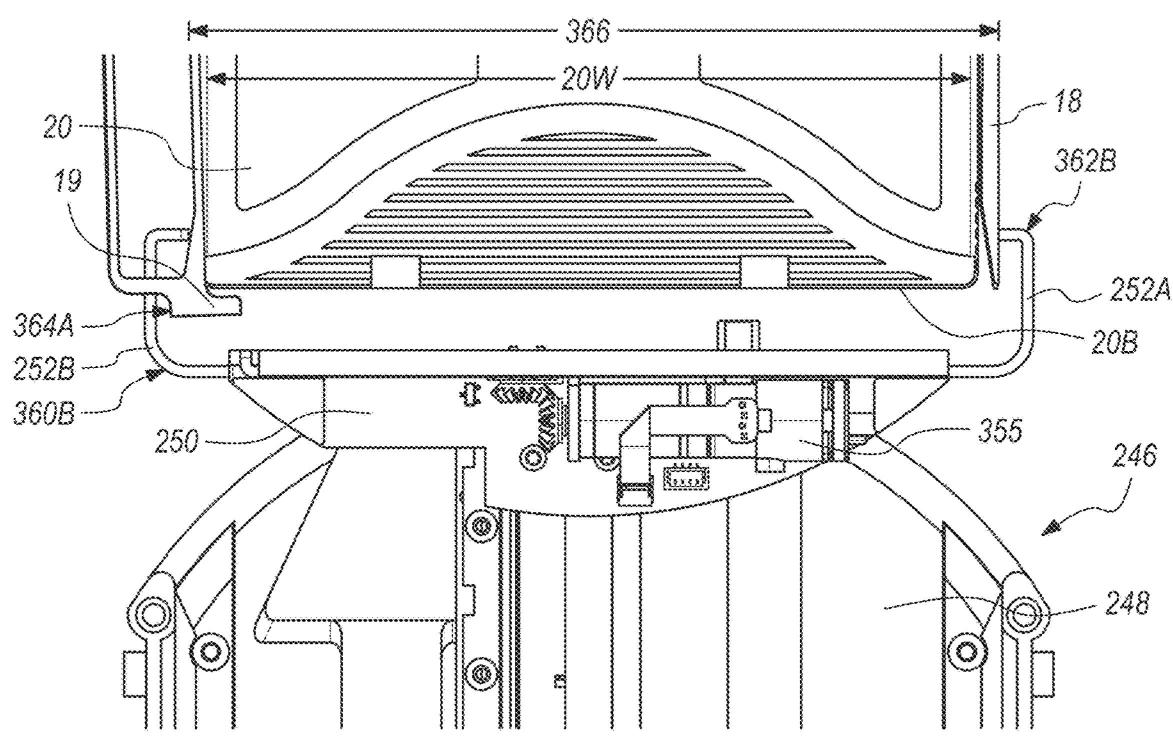
FIG. 3B is a simplified top view illustration of a second step of the picker system of FIG. 2 being used to access and remove the media cartridge from the storage slot of the media library.

Then, when the picker fingers 52 are so positioned near the particular storage slot 18 in the first extended position 360B, the picker fingers 52 can be moved from a first (closed) position 362A (illustrated, for example, in FIG. 3A) to a second (open) position 362B (illustrated, for example, in FIG. 3B).

Once the picker fingers 52 have been moved to the second (open) position 362B, the picker system 46 can further move the picker fingers 52 from the first extended position 360B to a second extended position 360C (illustrated in FIG. 3C) so that the picker fingers 52 are positioned directly adjacent to the particular storage slot 18 and/or the media cartridge 20.

Figure 3C:
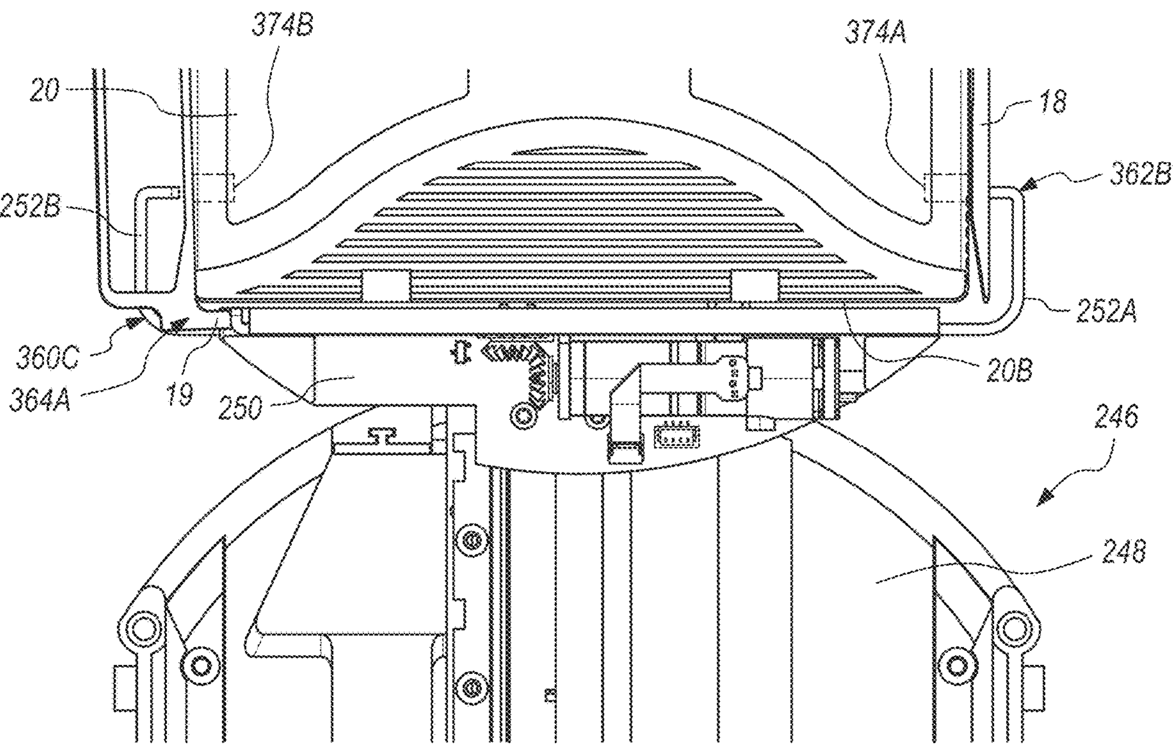
FIG. 3C is a simplified top view illustration of a third step of the picker system of FIG. 2 being used to access and remove the media cartridge from the storage slot of the media library.
Figure 3D:
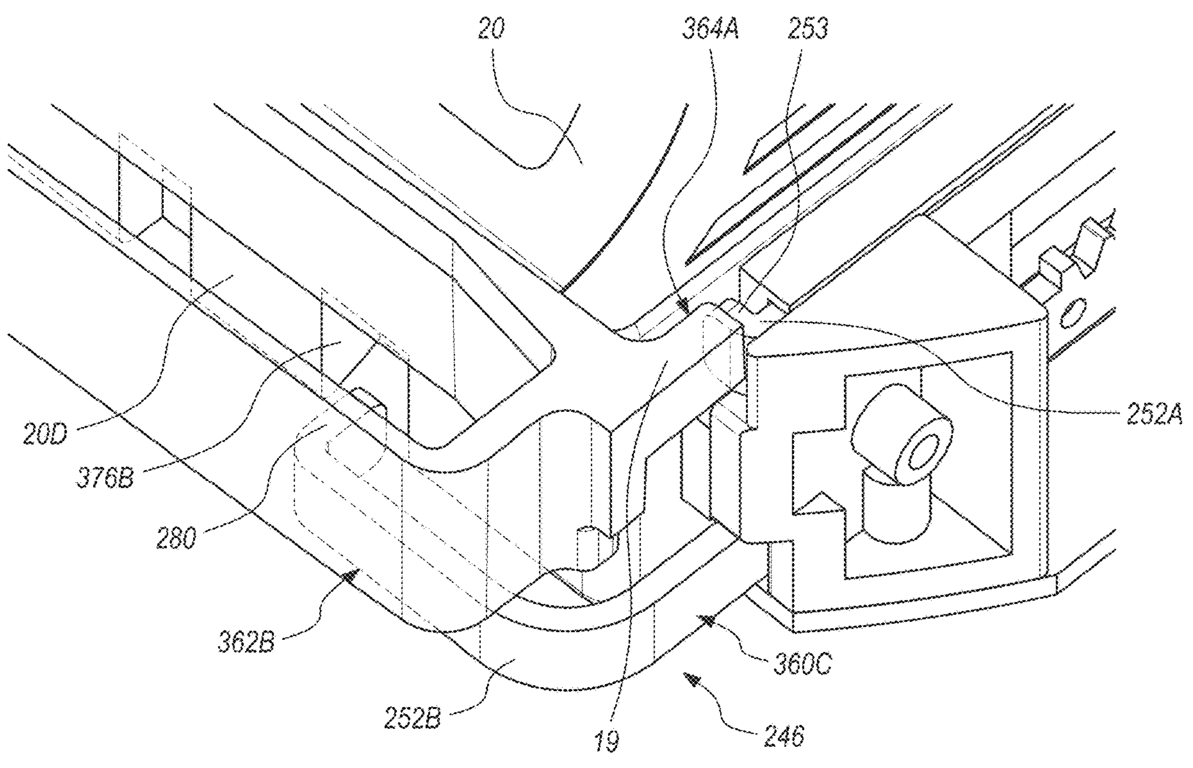
FIG. 3D is an enlarged top perspective view illustration of a portion of the picker system and the media cartridge of FIG. 3C.
Figure 3E:
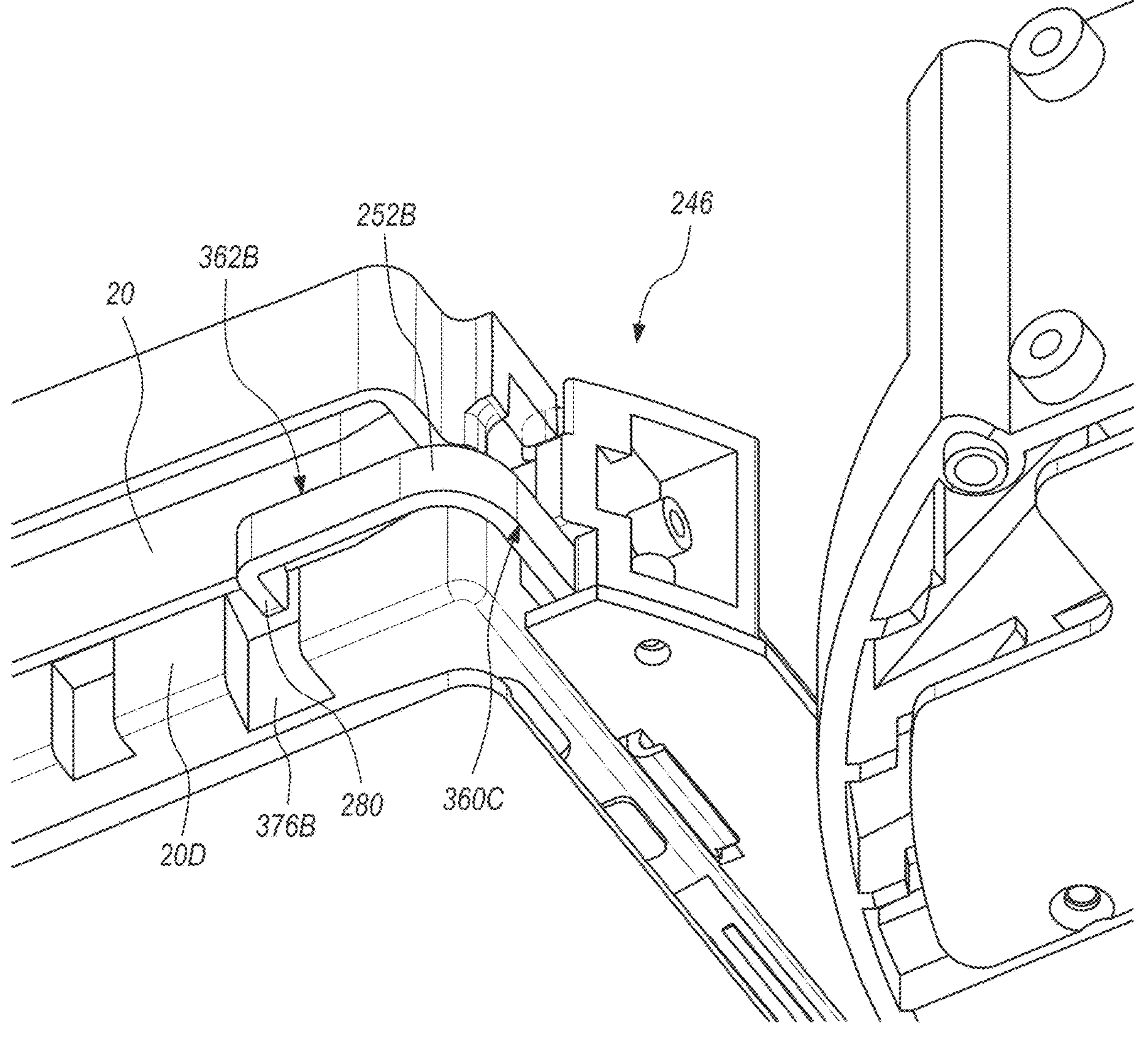
FIG. 3E is an enlarged bottom perspective view illustration of another portion of the picker system and the media cartridge of FIG. 3C.
Figure 3F:
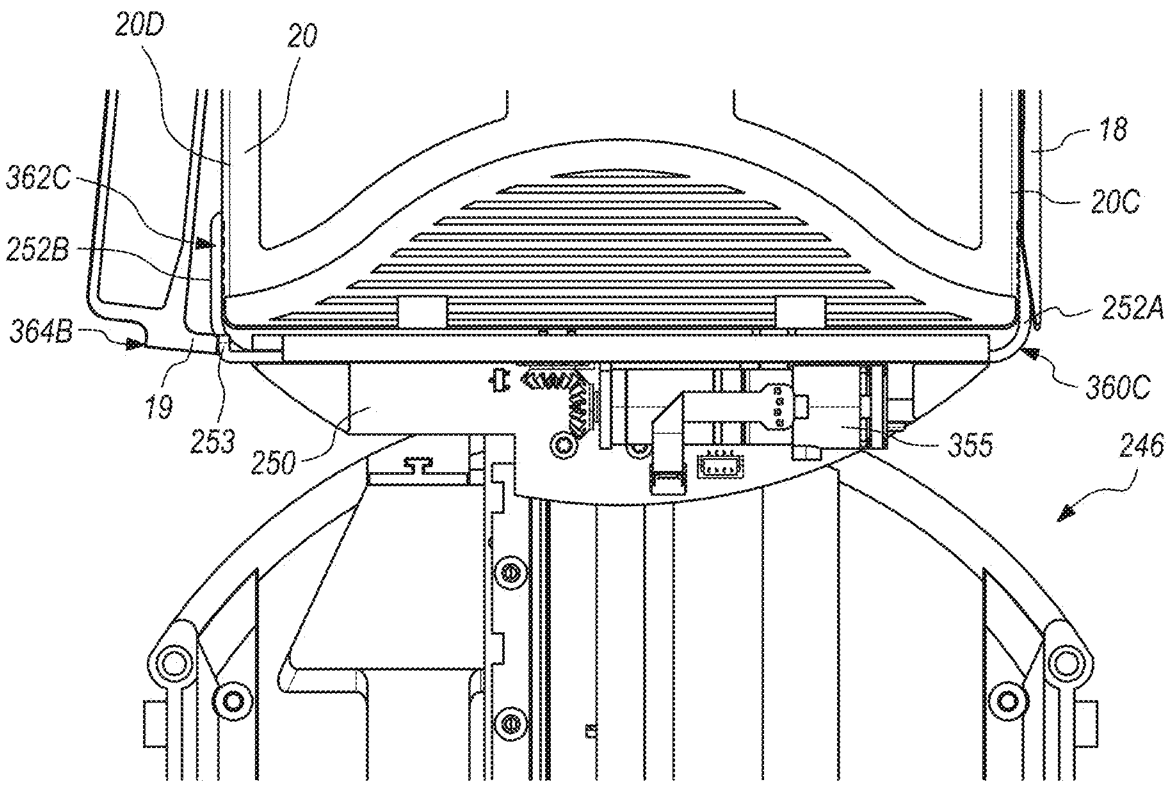
FIG. 3F is a simplified top view illustration of a fourth step of the picker system of FIG. 2 being used to access and remove the media cartridge from the storage slot of the media library.

With the picker fingers 52 positioned in the second extended position 360C directly adjacent to the storage slot 18, the picker fingers 52 can then be moved from the second (open) position 362B into a third (engaged) position 362C (illustrated, for example, in FIG. 3F). As the picker fingers 52 are moved into the third (engaged) position 362C, while being positioned directly adjacent to the storage slot 18, the picker fingers 52 can gradually engage opposing sides 20C, 20D of the media cartridge 20.

At the same time, as the picker fingers 52 are being moved to the third (engaged) position 362C, the latch deactivator 53 will gradually push and deactivate the latch 19 so that the media cartridge 20 can be successfully accessed and removed from the particular storage slot 18. Stated in another manner, when in the process of removing the media cartridge 20 from the storage slot 18, simultaneous movement of the picker fingers 52, and thus the latch deactivator 53, to the third (engaged) position 362C will cause the latch activator 53 to move the latch 19 from an activated position 364A (illustrated, for example, in FIG. 3A), in which the latch 19 is blocking removal of the media cartridge 20 from the storage slot 18, to a deactivated position 364B (illustrated, for example, in FIG. 3F), in which the latch 19 is no longer blocking removal of the media cartridge 20 from the storage slot 18. In certain embodiments, movement of the latch 19 between the activated position 364A and the deactivated position 364B entails rotational movement of the latch 19 about an axis of rotation 364X (illustrated in FIG. 3A).

Such full procedure for accessing and retrieving the media cartridge 20 from the storage slot 18 utilizing the retrieval assembly 24 and/or the picker system 46 will be illustrated and described in greater detail herein below.

In some embodiments, when necessary, the picker fingers 52 can further be moved to a fourth (push) position 562D (illustrated in FIG. 5) that enables the picker fingers 52 to provide a little extra push to the media cartridge 20 as the media cartridge 20 is being moved into a storage slot 18 or into a tape drive 26.

As described herein, the noted first (closed) position 362A, second (open) position 362B, third (engaged) position 362C, and fourth (push) position 562D are differentiated based on a lateral spread 366 (illustrated in FIG. 3A) of the picker fingers 52. For example, the first (closed) position 362A for the picker fingers 52 can include a lateral spread 366 of the picker fingers 52 that is less than a width 20W (illustrated for purposes of clarity in FIG. 3A) of the media cartridge 20, whereas the second (open) position 362B for the picker fingers 52 can include a lateral spread 366 of the picker fingers 52 that is greater than the width 20W of the media cartridge 20. The third (engaged) position 362C and the fourth (push) position 562D can also include a lateral spread 366 of the picker fingers 52 that is less than the width 20W of the media cartridge 20.

Additionally, as described in greater detail herein below, it is appreciated that in different embodiments of the picker system 46 and/or the picker fingers 52, the first (closed) position 362A for the picker fingers 52 can include a lateral spread 366 of the picker fingers 52 that is the same as for the third (engaged) position 362C and/or the fourth (push) position 562D. Alternatively, the first (closed) position 362A for the picker fingers 52 can include a lateral spread 366 of the picker fingers 52 that is different than both the third (engaged) position 362C and the fourth (push) position 562D.

The library housing 14 is configured to retain various components of the media library 10. For example, in the embodiment illustrated in FIG. 1, the plurality of storage slots 18, the rack assembly 22 including the rack(s) 32, the retrieval assembly 24, the one or more media drives 26 of the media drive system 12, the power supply 28, and the library control system 30 can all be received and retained at least substantially, if not entirely, within the library interior 16 that is defined by the library housing 14. As illustrated in FIG. 1, the library housing 14 can be rigid and can have a substantially rectangular-shaped cross-section. Alternatively, the library housing 14 can have another suitable shape or configuration. For example, the library housing 14 can have a substantially square-shaped cross-section or any other suitable shaped cross-section. In many embodiments, the library housing 14 may be constructed of any number of conventional materials such as, for example, those utilized in industry standard rack mount cabinets.

In the embodiment shown in FIG. 1, the plurality of storage slots 18 can be positioned within the library housing 14, with the storage slots 18 being configured to receive and retain (and store) the media cartridge(s) 20. More particularly, in various embodiments, each of the storage slots 18 is configured to receive and retain a single media cartridge 20. Alternatively, in other embodiments, one or more of the storage slots 18 can be configured to receive and retain more than one media cartridge 20, such as with one media cartridge 20 being positioned behind another within a given storage slot 18. It is noted that no media cartridges 20 are shown as being retained within the storage slots 18 in FIG. 1 for clarity.

As further illustrated in FIG. 1, a latch 19 is included with and/or coupled to each of the storage slots 18. The latch 19 is used to more securely retain the media cartridge 20 within the storage slot 18. As described herein, the latch 19 must be specifically moved, or deactivated, in order to effectively access and enable removal of the media cartridge 20 that is retained within the storage slot 18. More specifically, in order to access and retrieve the media cartridge 20 from the storage slot 18, the latch 19 must first be moved from the activated position 364A to the deactivated position 364B.

The media library 10 can include any suitable number of storage slots 18, and/or the media library 10 can be designed to retain any suitable number of media cartridges 20. For example, in certain embodiments, the media library 10 can be configured to include hundreds or even thousands of storage slots 18, each being configured to receive and retain one or more media cartridges 20.

Moreover, the storage slots 18 can be arranged within the media library 10 in any suitable manner. For example, the media library 10 can include one or more magazines 39 for purposes of providing the plurality of storage slots 18. For example, in the embodiment shown in FIG. 1, the media library 10 includes two magazines 39, one on each side of the retrieval assembly 24, with each magazine 39 including any suitable number of columns of storage slots 18, and with each column having any suitable number of storage slots 18 oriented substantially horizontally one on top of another (with limited spacing therebetween). It is understood that from the simplified top view shown in FIG. 1, the number of storage slots 18 in each column is not readily apparent. Alternatively, in certain non-exclusive alternative embodiments, the media library 10 can be configured to include more than two magazines 39, which can be oriented in any suitable manner relative to one another, and/or the media library 10 can only include a single magazine 39, or no magazines, with each of the storage slots 18 being independently positioned within the library housing 14.

The media cartridge 20 can have any suitable design. In many embodiments, the media cartridge 20 can be substantially rectangular box-shaped, including a front 20A, a rear 20B, a first side 20C, an opposed second side 20D, a top surface 20E, and a bottom surface (not shown in FIG. 1). Alternatively, the media cartridge 20 can have another suitable design.

It is appreciated that the use of the terms “first side” and “second side” is merely for convenience and ease of illustration, and either side 20C, 20D can be referred to as the “first side” or the “second side”.

The design and configuration of the rack assembly 22 can be varied to suit the specific requirements of the media library 10. For example, in one non-exclusive embodiment, the rack assembly 22 can include four individual racks 32 that are spaced apart from one another. In some embodiments, each rack 32 can be oriented in a generally vertical direction and can extend a height that is sufficient to enable the retrieval assembly 24 to effectively retrieve a media cartridge 20 from any of the plurality of storage slots 18. Alternatively, the rack assembly 22 can include a different number of racks 32. For example, in some non-exclusive alternative embodiments, the rack assembly 22 can include two racks 32, three racks 32 or more than four racks 32 that can be spaced apart from one another.

The retrieval assembly 24 and/or the picker system 46 selectively, such as upon request of a user 4 or host application 2, retrieves and moves the media cartridge 20 as desired between the storage slots 18 and the media drives 26. In particular, during use, upon receiving a signal from the library control system 30 to access a certain media cartridge 20, the retrieval assembly 24 and/or the picker system 46 can be manipulated to move in a desired manner in order to physically retrieve the requested media cartridge 20 from its associated storage slot 18 in the media library 10. Subsequently, the retrieval assembly 24 and/or the picker system 46 moves the media cartridge 20 to an appropriate media drive 26, and inserts the media cartridge 20 into a drive housing 40 of the media drive 26 so that the requested read/write operations can be performed. Upon completion of the requested read/write operations, the retrieval assembly 24 and/or the picker system 46 can then return the media cartridge 20 to an appropriate storage slot 18. It is appreciated that all actions of the retrieval assembly 24 and/or the picker system 46 are completed under control of the library control system 30.

The retrieval assembly 24 can have any suitable design for purposes of effectively moving the media cartridges 20 between the storage slots 18 and the media drives 26. For example, in various embodiments, the retrieval assembly 24 can include one or more of an assembly base 24A, an assembly guide system 24B, an assembly mover system 24C (illustrated in phantom), and the picker system 46. In many embodiments, the picker system 46 can include one or more of a picker base 48, a reach carriage 50, a pair of opposed picker fingers 52, a latch deactivator 53, a reach motor 54, a finger motor 355 (illustrated more clearly in FIG. 3A), a lead screw 56, and a guide rail 58. Alternatively, the retrieval assembly 24 and/or the picker system 46 can include more components or fewer components than what is specifically illustrated and described in relation to FIG. 1.

The assembly base 24A provides support for the picker system 46 as the picker system 46 accesses the media cartridges 20 and moves the media cartridges 20 between the storage slots 18 and the media drives 26. In many embodiments, the assembly base 24A can be a substantially rectangular-shaped plate that is coupled to each of the racks 32 of the rack assembly 22. Alternatively, the assembly base 24A can have another suitable design.

The assembly guide system 24B is configured to guide movement of the picker system 46 as the picker system 46 moves longitudinally along the assembly base 24A. In certain embodiments, as shown, the assembly guide system 24B can include a pair of guide rails that guide the movement of the picker system 46 longitudinally along the assembly base 24A. Alternatively, the assembly guide system 24B can have another suitable design.

The assembly mover system 24C is configured to move the assembly base 24A along the racks 32 of the rack assembly 22 so as to vertically position the picker system 46 as necessary relative to the storage slots 18 and/or the media drives 26. In some embodiments, the assembly mover system 24C can include four individual movers, with one mover being secured to and/or positioned adjacent to each of the corners of the assembly base 24A and also positioned adjacent to one of the racks 32 of the rack assembly 22. With such design, the assembly mover system 24C can effectively maintain the assembly base 24A in a level, horizontal position as the assembly base 24A is moved vertically up and down along the racks 32 of the rack assembly 22. Alternatively, the assembly mover system 24C can have another suitable design.

The picker system 46, as noted, is configured to selectively access the media cartridges 20 and move the media cartridges 20 between the storage slots 18 and the media drives 26. As shown, in various embodiments, the picker fingers 52 are coupled to the reach carriage 50 which is supported by the picker base 48.

As illustrated in the simplified schematic illustration of FIG. 1, the picker base 48 is shown as a substantially rectangular-shaped plate that can be moved longitudinally along the assembly base 24A while being guided in such movement by the guides of the assembly guide system 24B. In particular, when it is desired to use the picker system 46 to access a media cartridge 20 from a particular storage slot 18 and/or a particular media drive 26, the picker base 48 can be moved along the assembly base 24A as necessary to access the media cartridge 20.

Subsequently, the reach motor 54 can be activated to move the reach carriage 50, and thus the picker fingers 52, relative to the picker base 48 so that the picker fingers can access and engage with the media cartridge 20. For example, the reach motor 54 can rotate the reach carriage 50 relative to the picker base 48 so that the picker fingers 52 are appropriately oriented toward the storage slot 18 (on either side or in either magazine 39) and/or the media drive 26 in which the media cartridge 20 is currently positioned. Then, the reach motor 54 can activate the lead screw 56 so that the reach carriage 50, and thus the picker fingers 52, are driven along the picker base 48 from one end to the other, such as from the retracted position 360A to the first extended position 360B, so that the reach carriage 50 and the picker fingers 52 are positioned near the storage slot 18 and/or the media drive 26 in which the media cartridge 20 is currently positioned. As shown in this embodiment, the guide rail 58 can be used to guide such movement of the reach carriage 50 and the picker fingers 52 along the picker base 48.

It is appreciated that the reach motor 54, the lead screw 56, and the guide rail 58 can have any suitable design for purposes of moving and/or guiding the reach carriage 50 and the picker fingers 52 relative to the picker base 48 in the manner as described.

In situations where the picker system 46, and thus the picker fingers 52 are to be used to access the media cartridge 20 from a particular storage slot 18, the picker fingers 52 can be moved in the manner described briefly herein above, and in greater detail herein below, to directly access and engage the media cartridge 20. With the latch deactivator 53 being coupled to, secured to, and/or integrally formed with one of the picker fingers 52, as the picker fingers 52 are moved relative to the storage slot 18, the latch deactivator 53 is also correspondingly and/or simultaneously moved relative to the storage slot 18 in such a manner as to effectively deactivate the latch 19 so that the media cartridge 20 can be accessed and removed from the storage slot 18.

It is appreciated that although a single retrieval assembly 24 is illustrated in FIG. 1, the media library 10 can be designed to include more than one retrieval assembly 24. For example, in one non-exclusive alternative embodiment, the media library 10 can include two retrieval assemblies 24 that function in different portions of the media library 10 and/or that provide redundancy in the event that one of the retrieval assemblies 24 fails.

The one or more media drives 26 can be configured for reading and/or writing data with respect to the media cartridge 20. The number of media drives 26 provided within the media library 10 can be varied to suit the specific requirements of the media library 10. For example, in certain embodiments, the media library 10 can include three media drives 26 that are stacked substantially one on top of another (with limited spacing therebetween). Alternatively, the media library 10 can include greater than three or fewer than three media drives 26 and/or the media drives 26 can be positioned in a different manner relative to one another. For example, in certain non-exclusive alternative embodiments, the media library 10 can be configured to include one hundred or more media drives 26. Still alternatively, depending on the specific design of the media library 10, the media drives 26 can be adapted for use with different types of media, such as tape cartridges, optical drives, hard disk drives, etc.

In certain embodiments, the media library 10 can include more than a single media drive system 12 for purposes of providing the one or more media drives 26. For example, in some embodiments, the media library 10 can include a plurality of media drive systems 12, with each media drive system 12 including one or more individual media drives 26. In one embodiment, the media library 10 can include three individual media drive systems 12, with each media drive system 12 including a single media drive 26, to provide a total of three media drives 26 for the media library 10. Alternatively, the media library 10 can include any desired number of media drive systems 12 and/or media drives 26.

The power supply 28 provides electrical power in a well-known manner to the one or more media drives 26, the retrieval assembly 24, the library control system 30, the GUI 34, and/or additional media libraries 10. The power supply 28 can be interfaced with these components as well as with an external power source in a well-known manner using industry-standard cabling and connections. Alternatively, the power supply 28 can be interfaced with these components in another manner.

The library control system 30 provides the desired and necessary control for oversight functionality of the media library 10. The library control system 30 can have any suitable design, many of which are well-known in the industry. For example, in one embodiment, the library control system 30 can include a standard driver interface unit for receiving digital commands and translating the commands into driving currents, such as step pulses for controlling stepper motors. In another embodiment, the library control system 30 can include a standard programmable general-purpose computer formed on a single plug-in card unit and can include a programmed microprocessor or microcontroller, memory, communication interface, control interface, connectors, etc. Alternatively, the library control system 30 can have a different design and/or the library control system 30 can be positioned within the media library 10 in a different position or manner than that illustrated in FIG. 1.

The media library 10 can use well-known industry standard cabling and communication protocols between the library control system 30 and other structures of the media library 10. Cabling and electrical characteristics including signaling protocols can be generally standardized, and the logical message protocols can be either proprietary or standardized as known to those skilled in the art.

As shown, the media library 10 can also include the GUI 34, such as an interactive touchscreen graphical user interface or another suitable graphical user interface, which allows the user 4 or host 2 to interact with and/or transmit requests or commands to and/or from the media library 10.

It is appreciated that certain components of the media library 10 are described herein as being oriented and/or being moved in a horizontal or vertical direction within the media library 10. For example, the storage slots 18, and thus the media cartridges 20 that can be retained therein, are generally described as having a horizontal orientation within the media library 10; and the retrieval assembly 24 is generally described as moving vertically along the racks 32 of the rack assembly 22 to access the storage slots 18 and/or the media cartridges 20 retained therein. However, such general descriptions are not intended to be limiting in any manner, as each of said components can have another such orientation without straying from the intended scope and breadth of the present invention. For example, in one non-exclusive alternative embodiment, the storage slots 18, and thus the media cartridges 20 that can be retained therein, can have a generally vertical orientation within the media library 10; and the retrieval assembly 24 can move generally horizontally along the racks 32 of the rack assembly 22 to access the storage slots 18 and/or the media cartridges 20 retained therein.

Figure 2:
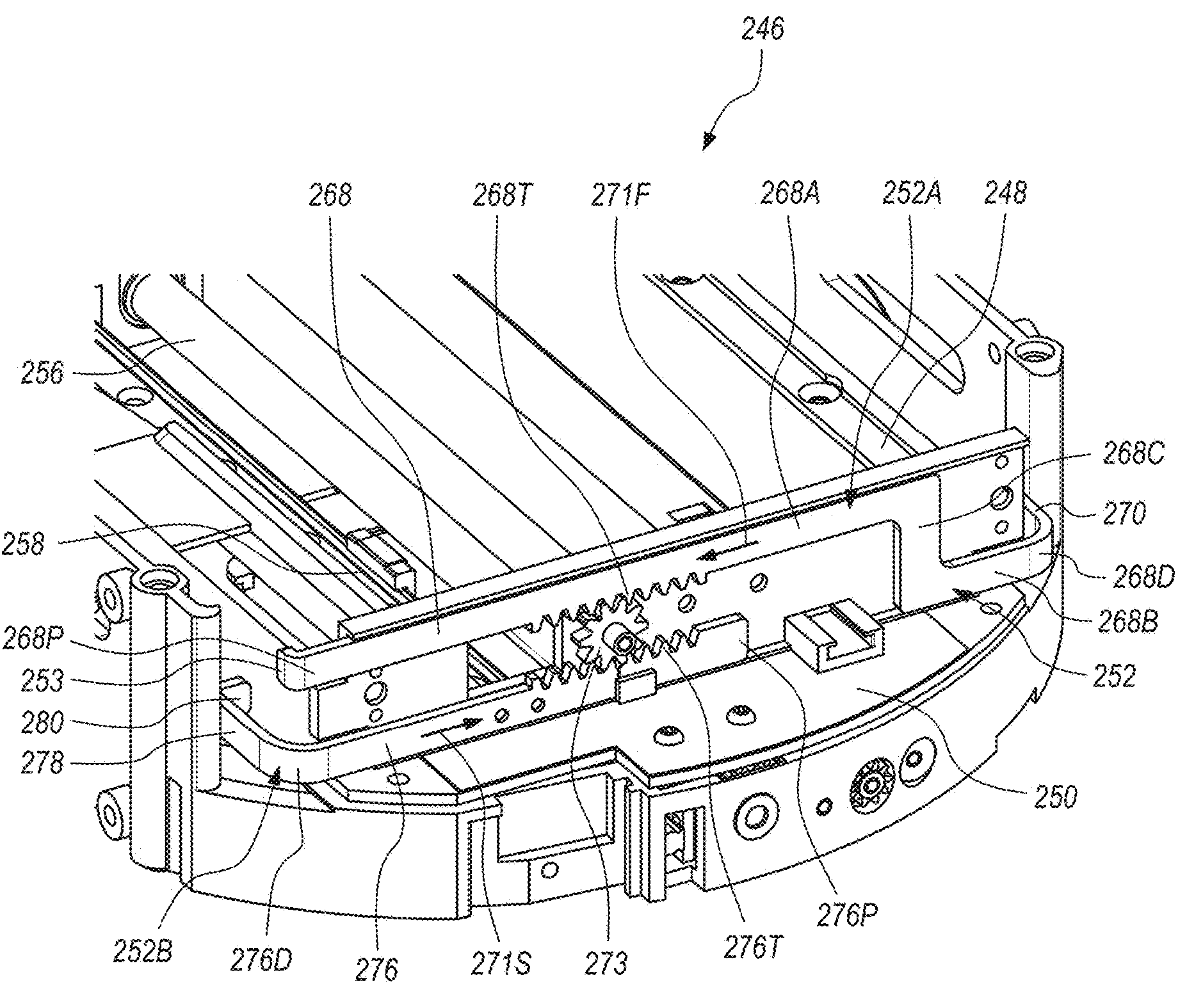
FIG. 2 is a perspective view illustration of a portion of an embodiment of the picker system.

FIG. 2 is a perspective view illustration of a portion of an embodiment of the picker system 246. The design of the picker system 246 can be varied to suit the requirements of the retrieval assembly 24 and/or the media library 10 illustrated in FIG. 1. Similar to the embodiment described above, in certain embodiments, the picker system 246 can again include a picker base 248, a reach carriage 250, a pair of opposed picker fingers 252, such as a first picker finger 252A and an opposed second picker finger 252B, a latch deactivator 253, a reach motor 54 (illustrated in FIG. 1), a finger motor 355 (illustrated in FIG. 3A), a lead screw 256 and a guide rail 258. The picker base 248, the reach carriage 250, the picker fingers 252, the latch deactivator 253, the reach motor 54, the lead screw 256 and the guide rail 258 are substantially similar in design and function to what was illustrated and described herein above in relation to FIG. 1. Thus, features and aspects of such components will not be repeated in detail herein in relation to FIG. 2. Rather, only features and aspects of the picker system 246, such as many features and aspects of the picker fingers 252 and the latch deactivator 253, that were not clearly illustrated and described in relation to FIG. 1 will be described in detail in relation to FIG. 2.

Figure 5:
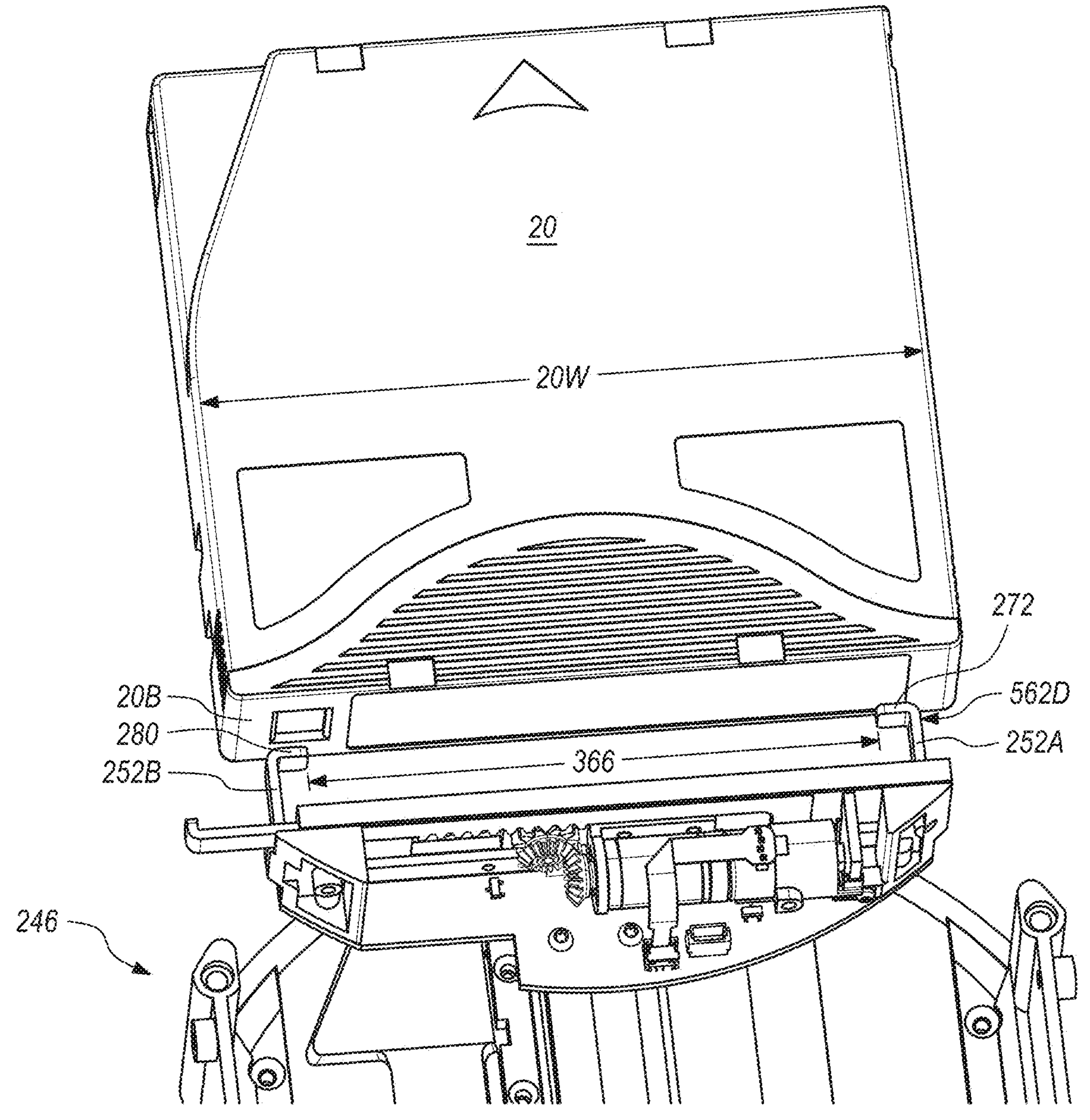
FIG. 5 is a simplified top perspective view illustration of a portion of the picker system of FIG. 2 and a media cartridge, with the picker system being used in a push mode.

As illustrated in FIG. 2, the reach carriage 250 is movably mounted on the picker base 248, and the picker fingers 252A, 252B are movably coupled to the reach carriage 250. Additionally, as noted above, in many embodiments, the reach carriage 250 and the picker fingers 252A, 252B are selectively movable, collectively through activation of the reach motor 54, relative to the picker base 248 from and between a retracted position 360A (such as illustrated in FIG. 3A), a first extended position 360B (such as illustrated in FIG. 3B), and a second extended position 360C (such as illustrated in FIG. 3C). Further, as also noted above and as described in greater detail herein below, in various embodiments, the picker fingers 252A, 252B, through activation of the finger motor 355, are selectively movable relative to one another (and relative to the reach carriage 250) from and between a first (closed) position 362A (such as illustrated in FIG. 3A), a second (open) configuration 362B (such as illustrated in FIG. 3B), a third (engaged) position 362C (such as illustrated in FIG. 3F), and a fourth (push) configuration 562D (such as illustrated in FIG. 5).

During use of the picker system 246 to access and retrieve a media cartridge 20 (illustrated in FIG. 1) from a storage slot 18 (illustrated in FIG. 1) and/or a media drive 26 (illustrated in FIG. 1), the picker fingers 252A, 252B are configured to selectively engage opposing sides 20C, 20D (illustrated in FIG. 1) of the media cartridge 20. More particularly, in various embodiments, the first picker finger 252A is configured to selectively engage the first side 20C (illustrated in FIG. 1) of the media cartridge 20, while, simultaneously, the second picker finger 252B is configured to selectively engage the second side 20D (illustrated in FIG. 1) of the media cartridge 20.

It is appreciated that the use of the terms "first picker finger" and "second picker finger" is merely for convenience and ease of illustration, and either picker finger 252A, 252B can be referred to as the "first picker finger" or the "second picker finger".

The design of the first picker finger 252A can be varied. As shown in the embodiment illustrated in FIG. 2, the first picker finger 252A includes (i) a first base section 268, (ii) a first intermediate section 270 that is coupled to, secured to, and/or integrally formed with the first base section 268, and (iii) a first engaging tip 272 (illustrated in FIG. 3A) that is coupled to, secured to, and/or integrally formed with the first intermediate section 270. In various embodiments, as shown, the first picker finger 252A can further include the latch deactivator 253 that can be coupled to, secured to, and/or integrally formed with the first base section 268 of the first picker finger 252A. Alternatively, the first picker finger 252A can have another suitable design, with more components or fewer components than those specifically illustrated in FIG. 2.

As illustrated, the first base section 268 includes a proximal end 268P and a distal end 268D, and is configured to be positioned substantially parallel to the rear 20B (illustrated in FIG. 1) of the media cartridge 20 during a retrieval process. As further shown in FIG. 2, the first base section 268 can have a stepped design, including (a) a substantially straight, rectangular bar-shaped, first segment 268A that extends from the proximal end 268P, (b) a substantially straight, rectangular bar-shaped, second segment 268B that extends from the distal end 268D, and (c) a substantially straight, rectangular bar-shaped, stepped segment 268C that is coupled to, secured to, and/or integrally formed with the first segment 268A and the second segment 268B, and extends between the first segment 268A and the second segment 268B. As shown, each of the first segment 268A and the second segment 268B are configured to extend substantially horizontally, although at different heights relative to one another and/or relative to the media cartridge 20 and the storage slot 18 to be accessed. The stepped segment 268C is configured to extend generally vertically between the first segment 268A and the second segment 268 to enable the different heights of the first segment 268A and the second segment 268B.

In many embodiments, as shown, the first segment 268A of the first base section 268 of the picker finger 252A can include a first tooth set 268T that is configured to movingly engage a rotating gear 273 that is usable for adjusting the lateral spread 366 (illustrated in FIG. 3A) between the picker fingers 252A, 252B so that the picker fingers 252A, 252B can move between the first (closed) position 362A, the second (open) position 362B, the third (engaged) position 362C, and the fourth (push) position 562D.

As further illustrated in FIG. 2, the latch deactivator 253 is coupled to, secured to, and/or integrally formed with the proximal end 268P of the first base section 268. In many embodiments, the latch deactivator 253 extends at an angle, such as approximately 90 degrees, away from the proximal end 268P of the first base section 268, while still being maintained at the same approximate horizontal level as the first segment 268A of the first base section 268. The latch deactivator 253 is oriented in such direction that it extends toward the media cartridge 20 and/or the storage slot 18 when the picker system 246 is being used to access and retrieve the media cartridge 20 from the storage slot 18. With such design and orientation, the latch deactivator 253 is configured to contact the latch 19 (illustrated in FIG. 1) of the storage slot 18 as the picker fingers 252A, 252B are being moved from the second (open) position 362B to the third (engaged) position 362C. More specifically, with such design and orientation, the latch deactivator 253 is configured to move the latch 19 from the activated position 364A to the deactivated position 364B simultaneously as the picker fingers 252A, 252B are being moved from the second (open) position 362B to the third (engaged) position 362C. Moreover, during such movement of the picker fingers 252A, 252B from the second (open) position 362B to the third (engaged) position 362C, the first picker finger 252A is configured to move in a first direction 271F (illustrated with an arrow), and the latch deactivator 253 is configured to move in the same first direction 271F; and the second picker finger 252B is configured to move in a second direction 271S (illustrated with an arrow) that is opposite the first direction 271F. As further noted herein, it is appreciated that the reach carriage 250 does not move relative to the media cartridge 20 as the picker fingers 252A, 252B are being moved from the second (open) position 362B to the third (engaged) position 362C.

The first intermediate section 270 is coupled to, secured to, and/or integrally formed with the distal end 268D of the first base section 268. The first intermediate section 270 extends at an angle, such as approximately 90 degrees, away from the distal end 268D of the first base section 268, while still being maintained at the same approximate horizontal level as the second segment 268B of the first base section 268. The first intermediate section 270 is oriented in such direction that it extends toward the media cartridge 20 and/or the storage slot 18 when the picker system 246 is being used to access and retrieve the media cartridge 20 from the storage slot 18. Thus, it is appreciated that the first intermediate section 270 extends away from the distal end 268D of the first base section 268 in essentially the same direction (i.e. a parallel direction) as the latch deactivator 253 extends away from the proximal end 268P of the first base section 268.

The first engaging tip 272 is coupled to, secured to, and/or integrally formed with the first intermediate section 270 at the end of the first intermediate section 270 positioned away from the distal end 268D of the first base section 268. As shown, the first engaging tip 272 extends inwardly at an angle, such as approximately 90 degrees, from the end of the first intermediate section 270 positioned away from the distal end 268D of the first base section 268. With such design and orientation, the first engaging tip 272 is configured to engage a portion of the first side 20C of the media cartridge 20 when the picker fingers 252A, 252B are moved from the second (open) position 362B to the third (engaged) position 362C. In certain embodiments, as illustrated and described in greater detail herein below, the first side 20C of the media cartridge 20 includes a first engagement recess 374A (illustrated in phantom in FIG. 3C), and the first engaging tip 272 is configured to extend into and engage the first engagement recess 374A as the picker fingers 252A, 252B are moved from the second (open) position 362B to the third (engaged) position 362C.

The design of the second picker finger 252B can also be varied. As shown in the embodiment illustrated in FIG. 2, the second picker finger 252B includes (i) a second base section 276, (ii) a second intermediate section 278 that is coupled to, secured to, and/or integrally formed with the second base section 276, and (iii) a second engaging tip 280 that is coupled to, secured to, and/or integrally formed with the second intermediate section 278. Alternatively, the second picker finger 252B can have another suitable design, with more components or fewer components than those specifically illustrated in FIG. 2.

As illustrated, the second base section 276 includes a proximal end 276P and a distal end 276D, and is configured to be positioned substantially parallel to the rear 20B of the media cartridge 20 during a retrieval process. As further shown in FIG. 2, the second base section 276 is substantially straight, rectangular bar-shaped and includes a second tooth set 276T that is incorporated therein. The second tooth set 276T is configured to movably engage the rotating gear 273 as the picker fingers 252A, 252B are moved between the first (closed) position 362A, the second (open) position 362B, the third (engaged) position 362C, and the fourth (push) position 562D.

During an adjustment of the lateral spread 366 between the picker fingers 252A, 252B, the first tooth set 268T of the first picker finger 252A is configured to movingly engage an upper portion of the rotating gear 273, and the second tooth set 276T of the second picker finger 252B is configured to movingly engage a lower portion of the rotating gear 273. As illustrated, it is appreciated that the first segment 268A of the first base section 268 of the first picker finger 252A, and thus the first tooth set 268T, is spaced apart from and substantially parallel to the second base section 276 of the second picker finger 252B, and thus the second tooth set 276T, on opposite sides of the rotating gear 273.

In many embodiments, the finger motor 355 (illustrated in FIG. 3A) can be activated in order to rotate the rotating gear 273 in a desired rotational direction, either clockwise or counter-clockwise. More particularly, in certain embodiments, the finger motor 355 can rotate a first beveled gear 382 (illustrated in FIG. 3A) that engages and thus rotates a second beveled gear 384 (illustrated in FIG. 3A). The second beveled gear 384 is coupled to and rotates with the rotating gear 273 shown in FIG. 2. Thus, rotation of the first beveled gear 382 in a first rotational direction, such as clockwise, results in rotation of the second beveled gear 384, and thus the rotating gear 273, in a second rotational direction, such as counter-clockwise, that is opposite to the first rotational direction. Conversely, rotation of the first beveled gear 382 in the second rotational direction, such as counter-clockwise, results in rotation of the second beveled gear 384, and thus the rotating gear 273, in the first rotational direction, such as clockwise.

In the embodiment illustrated in FIG. 2, due to the engagement between the first tooth set 268T and the upper portion of the rotating gear 273 and the engagement between the second tooth set 276T and the lower portion of the rotating gear 273, clockwise rotation of the rotating gear 273 causes the first picker finger 252A to move generally left-to-right (as illustrated on FIG. 2), while causing the second picker finger 252B to move generally right-to-left (as illustrated on FIG. 2). Stated in another manner, clockwise rotation of the rotating gear 273 results in an increasing lateral spread 366 between the picker fingers 252A, 252B. Conversely, counter-clockwise rotation of the rotating gear 273 causes the first picker finger 252A to move generally right-to-left (as illustrated on FIG. 2), while causing the second picker finger 252B to move generally left-to-right (as illustrated on FIG. 2). Stated in another manner, counter-clockwise rotation of the rotating gear 273 results in a decreasing lateral spread 366 between the picker fingers 252A, 252B.

The second intermediate section 278 is coupled to, secured to, and/or integrally formed with the distal end 276D of the second base section 276. The second intermediate section 278 extends at an angle, such as approximately 90 degrees, away from the distal end 276D of the first base section 276, while still being maintained at the same approximate horizontal level as the second base section 276. The second intermediate section 278 is oriented in such direction that it extends toward the media cartridge 20 and/or the storage slot 18 when the picker system 246 is being used to access and retrieve the media cartridge 20 from the storage slot 18.

The second engaging tip 280 is coupled to, secured to, and/or integrally formed with the second intermediate section 278 at the end of the second intermediate section 278 positioned away from the distal end 276D of the second base section 276. As shown, the second engaging tip 280 extends inwardly at an angle, such as approximately 90 degrees, from the end of the second intermediate section 278 positioned away from the distal end 276D of the second base section 276. With such design and orientation, the second engaging tip 280 is configured to engage a portion of the second side 20D of the media cartridge 20 when the picker fingers 252A, 252B are moved from the second (open) position 362B to the third (engaged) position 362C. In certain embodiments, as illustrated and described in greater detail herein below, the second side 20D of the media cartridge 20 includes a second engagement recess 374B (illustrated in phantom in FIG. 3C), and the second engaging tip 280 is configured to extend into and engage the second engagement recess 374B as the picker fingers 252A, 252B are moved from the second (open) position 362B to the third (engaged) position 362C.

With the first engaging tip 272 of the first picker finger 252A engaging the first engagement recess 374A formed into the first side 20C of the media cartridge 20, and with the second engaging tip 280 of the second picker finger 252B engaging the second engagement recess 374B formed into the second side 20D of the media cartridge 20, the picker system 246 and/or the picker fingers 252A, 252B can effectively grasp, hold and move the media cartridge 20 as desired between the storage slots 18 and the media drives 26.

As noted above, the lateral spread 366 of the picker fingers 252A, 252B is utilized to describe whether the picker fingers 252A, 252B are in the first (closed) position 362A, the second (open) position 362B, the third (engaged) position 362C, or the fourth (push) position 562D. As utilized herein, the "lateral spread" for the picker fingers 252A, 252B is defined by the minimum spacing between the first engaging tip 272 of the first picker finger 252A and the second engaging tip 280 of the second picker finger 252B.

FIGS. 3A-3I illustrate a step-by-step process by which the picker system 246 of FIG. 2 is usable to selectively grasp a media cartridge 20 and remove the media cartridge 20 from a storage slot 18. As noted above, and as illustrated more clearly in these Figures, the picker fingers 252A, 252B of the picker system 246 are movable, through activation of the finger motor 355, between the first (closed) position 362A (illustrated in FIG. 3A), the second (open) position 362B (illustrated in FIG. 3B), and the third (engaged) position (illustrated in FIG. 3F). It is further noted that, in certain implementations, the picker fingers 252A, 252B can also be positioned in the fourth (push) position 562D (illustrated in FIG. 5). Additionally, as further illustrated in these Figures, during the process of removing the media cartridge 20 from the storage slot 18, the reach carriage 250 and the picker fingers 252A, 252B are also movable, through activation of the reach motor 54 (illustrated in FIG. 1), between (i) the retracted position 360A (illustrated in FIG. 3A), which can include any of a range of positions wherein the picker fingers 252A, 252B are positioned substantially directly above the picker base 248 of the picker system 246, (ii) the first extended position 360B (illustrated in FIG. 3B), wherein the picker fingers 252A, 252B are positioned near the storage slot 18 and/or the media cartridge 20, and no longer are positioned substantially directly above the picker base 248, and (iii) the second extended position 360C (illustrated in FIG. 3C), wherein the picker fingers 252A, 252B are positioned substantially directly adjacent to the storage slot 18 and/or the media cartridge 20.

FIG. 3A is a simplified top view illustration of a first step of the picker system 246 of FIG. 2 being used to access and remove a media cartridge 20 from a storage slot 18 of the media library 10 (illustrated in FIG. 1). As shown in FIG. 3A, the reach carriage 250 and/or the picker fingers 252A, 252B of the picker system 246 are positioned in the retracted position 360A, with the reach carriage 250 and the picker fingers 252A, 252B being positioned substantially directly above the picker base 248.

As further shown in FIG. 3A, the picker fingers 252A, 252B are further illustrated being in the first (closed) position 362A, with the lateral spacing 366 between the engaging tips 272, 280 of the picker fingers 252A, 252B, being less than the width 20W of the media cartridge 20. FIG. 3A further shows the finger motor 355 that is usable to move the picker fingers 252A, 252B between the first (closed) position 362A, the second (open) position 362B (illustrated in FIG. 3B), the third (engaged) position 362C (illustrated in FIG. 3F), and the fourth (push) position 562D (illustrated in FIG. 5).

During this first step, the latch 19 for the storage slot 18 is shown in the activated position 364A, with the latch 19 being utilized to more securely retain the media cartridge 20 within the storage slot 18.

FIG. 3A further illustrates an axis of rotation 364X (directed in and out of the page) about which the latch 19 can be rotated during movement of the latch 19 between the activated position 364A and the deactivated position 364B (illustrated in FIG. 3F). More particularly, in some embodiments, movement of the latch 19 between the activated position 364A and the deactivated position 364B (illustrated in FIG. 3F) can entail rotational movement of the latch 19 about the axis of rotation 364X.

Also indicated in FIG. 3A is a latch contact surface 19S of the latch 19, which is selectively contacted by the latch deactivator 253 (illustrated in FIG. 2) when the latch deactivator 253 is being used to move the latch 19 from the activated position 364A to the deactivated position 364B. It is appreciated that the latch contact surface 19S can have any suitable design to create any suitable type of contact between the latch deactivator 253 and the latch contact surface 19S. For example, in certain non-exclusive embodiments, the latch contact surface 19S can be non-planar and/or can be angled such that the latch contact surface 19S is not perpendicular to the rear 20B of the media cartridge 20. More specifically, in some such non-exclusive embodiments, the latch contact surface 19S can be somewhat curved and/or can be angled in any suitable manner relative to the rear 20B of the media cartridge 20, such as top-to-bottom, bottom-to-top, front-to-back, or back-to-front.

It is also appreciated that in the embodiment illustrated in FIG. 3A, the storage slot 18 has a size that is capable of receiving and retaining two media cartridges, with one positioned behind the other, although only one media cartridge 20 is presently being retained within the storage slot 18.

FIG. 3B is a simplified top view illustration of a second step of the picker system 246 of FIG. 2 being used to access and remove the media cartridge 20 from the storage slot 18 of the media library 10 (illustrated in FIG. 1). As shown in FIG. 3B, the reach motor 54 (illustrated in FIG. 1) has been utilized to move the reach carriage 250 and/or the picker fingers 252A, 252B relative to the picker base 248 from the retracted position 360A (illustrated in FIG. 3A) to the first extended position 360B. As noted above, when the reach carriage 250 and/or the picker fingers 252A, 252B are in the first extended position 360B, the reach carriage 250 and/or the picker fingers 252A, 252B are positioned near the rear 20B of the media cartridge 20 and are no longer positioned fully directly above the picker base 248.

As further shown in FIG. 3B, the finger motor 355 has been utilized to move the picker fingers 252A, 252B from the first (closed) position 362A (illustrated in FIG. 3A) to the second (open) position 362B. With the picker fingers 252A, 252B now in the second (open) position 362B, the picker fingers 252A, 252B now have a lateral spacing 366 between the engaging tips 272, 280 of the picker fingers 252A, 252B that is greater than the width 20W of the media cartridge 20.

During this second step, the latch 19 for the storage slot 18 is again shown in the activated position 364A, with the latch 19 being utilized to more securely retain the media cartridge 20 within the storage slot 18.

FIG. 3C is a simplified top view illustration of a third step of the picker system 246 of FIG. 2 being used to access and remove the media cartridge 20 from the storage slot 18 of the media library 10 (illustrated in FIG. 1). As shown in FIG. 3C, the reach motor 54 (illustrated in FIG. 1) has been utilized to move the reach carriage 250 and/or the picker fingers 252A, 252B relative to the picker base 248 from the first extended position 360B (illustrated in FIG. 3B) to the second extended position 360C. As noted above, when the reach carriage 250 and/or the picker fingers 252A, 252B are in the second extended position 360C, the picker fingers 252A, 252B are now positioned substantially directly adjacent to the rear 20B of the media cartridge 20.

As further shown in FIG. 3C, during this third step, the picker fingers 252A, 252B are still in the second (open) position 362B, and the latch 19 for the storage slot 18 is still in the activated position 364A. As illustrated, at this time, the latch deactivator 253 that is coupled to, secured to, and/or integrally formed with the first picker finger 252A is positioned directly adjacent to the latch 19.

FIG. 3D is an enlarged top perspective view illustration of a portion of the picker system 246 and the media cartridge 20 of FIG. 3C. More particularly, FIG. 3D is an enlarged top perspective view showing a portion of the second picker finger 252B, with the second engaging tip 280 being positioned substantially adjacent to, but not within the second engagement recess 376B that is formed into the second side 20D of the media cartridge 20. Thus, as illustrated, the picker fingers 252A, 252B are in the second extended position 360C, and in the second (open) position 362B.

As also shown in FIG. 3D, the latch deactivator 253 of the first picker finger 252A is positioned directly adjacent to the latch 19, with the latch 19 being in the activated position 364A.

FIG. 3E is an enlarged bottom perspective view illustration of another portion of the picker system 246 and the media cartridge 20 of FIG. 3C. In particular, FIG. 3E is an enlarged bottom perspective view showing a portion of the second picker finger 252B, with the second engaging tip 280 again being positioned substantially adjacent to, but not within the second engagement recess 376B that is formed into the second side 20D of the media cartridge 20. Thus, as illustrated, the second picker finger 252B is in the second extended position 360C, and in the second (open) position 362B.

FIG. 3F is a simplified top view illustration of a fourth step of the picker system 246 of FIG. 2 being used to access and remove the media cartridge 20 from the storage slot 18 of the media library 10 (illustrated in FIG. 1). As shown in FIG. 3F, with the reach carriage 250 and/or the picker fingers 252A, 252B still in the second extended position 360C, the finger motor 355 has been utilized, in a manner such as described above, to move the picker fingers 252A, 252B to the third (engaged) position 362C. During such movement to the third (engaged) position 362C, the latch deactivator 253, as coupled to, secured to, and/or integrally formed with the first picker finger 252A, moves simultaneously with the picker fingers 252A, 252B to push and/or move the latch 19 that is coupled to the storage slot 18 from the activated position 364A (illustrated in FIG. 3C) to the deactivated position 364B. It is appreciated that during movement of the latch 19 from the activated position 364A to the deactivated position 364B as described, because the reach carriage 250 and/or the picker fingers 252A, 252B remain in the second extended position 360C, the reach carriage 250 does not move relative to the media cartridge 20 during such latch deactivation procedure.

As now shown in the third (engaged) position 362C, the first engaging tip 272 (illustrated in FIG. 3A) of the first picker finger 252A is now positioned substantially within and is engaging the first engagement recess 374A (illustrated in FIG. 3C) that is formed into the first side 20C of the media cartridge 20; and the second engaging tip 280 (illustrated in FIG. 3A) of the second picker finger 252B is now positioned substantially within and is engaging the second engagement recess 374B (illustrated in FIG. 3C) that is formed into the second side 20D of the media cartridge 20. With the engaging tips 272, 280 of the picker fingers 252A, 252B so positioned, the picker system 246 and/or the picker fingers 252A, 252B can effectively grasp and hold the media cartridge 20.

Additionally, with the latch 19 now being in the deactivated position 364B, the latch 19 is no longer positioned to inhibit the media cartridge 20 from being removed from within the storage slot 18.

Figure 3G:
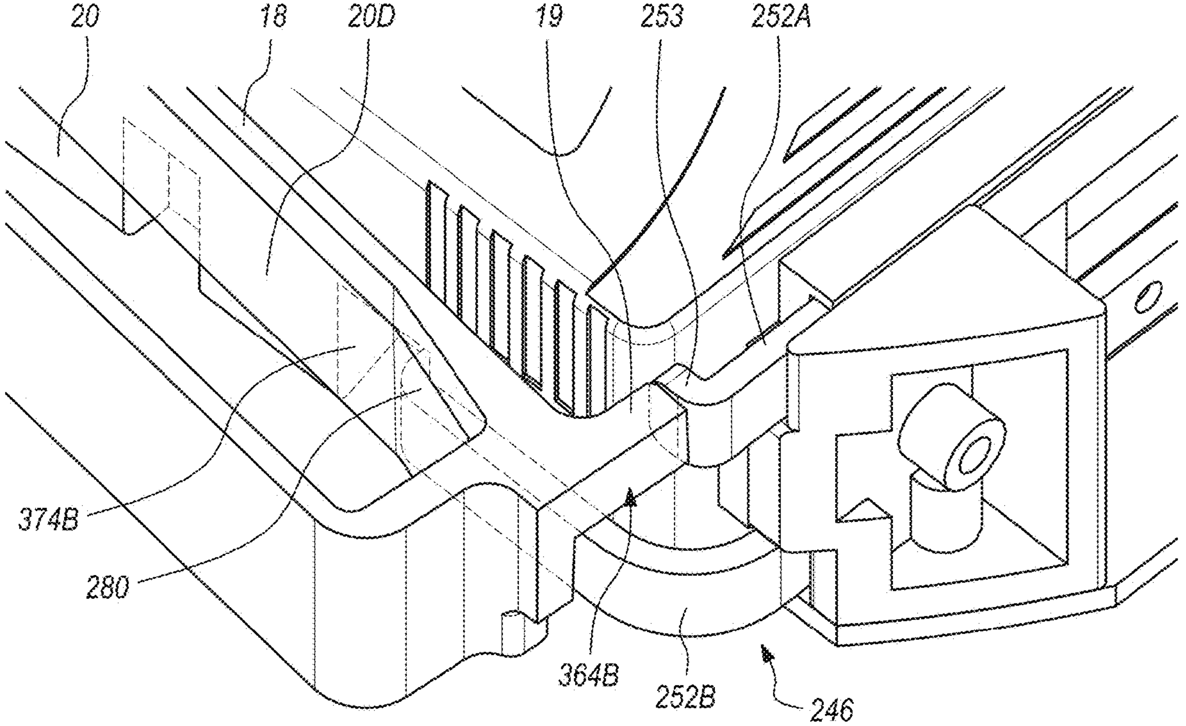
FIG. 3G is an enlarged top perspective view illustration of a portion of the picker system and the media cartridge of FIG. 3F.

FIG. 3G is an enlarged top perspective view illustration of a portion of the picker system 246 and the media cartridge 20 of FIG. 3F. In particular, FIG. 3G is an enlarged top perspective view showing the second engaging tip 280 of the second picker finger 252B positioned substantially within and engaging the second engagement recess 374B formed into the second side 20D of the media cartridge 20.

As further shown in FIG. 3G, the latch deactivator 253 of the first picker finger 252A has pushed and/or moved the latch 19 into the deactivated position 364B. At this time, the picker fingers 252A, 252B are actively engaged with the media cartridge 20, and the latch 19 is no longer positioned to inhibit the media cartridge 20 from being removed from within the storage slot 18. Thus, the media cartridge 20 is fully ready for removal from the storage slot 18.

Figure 3H:
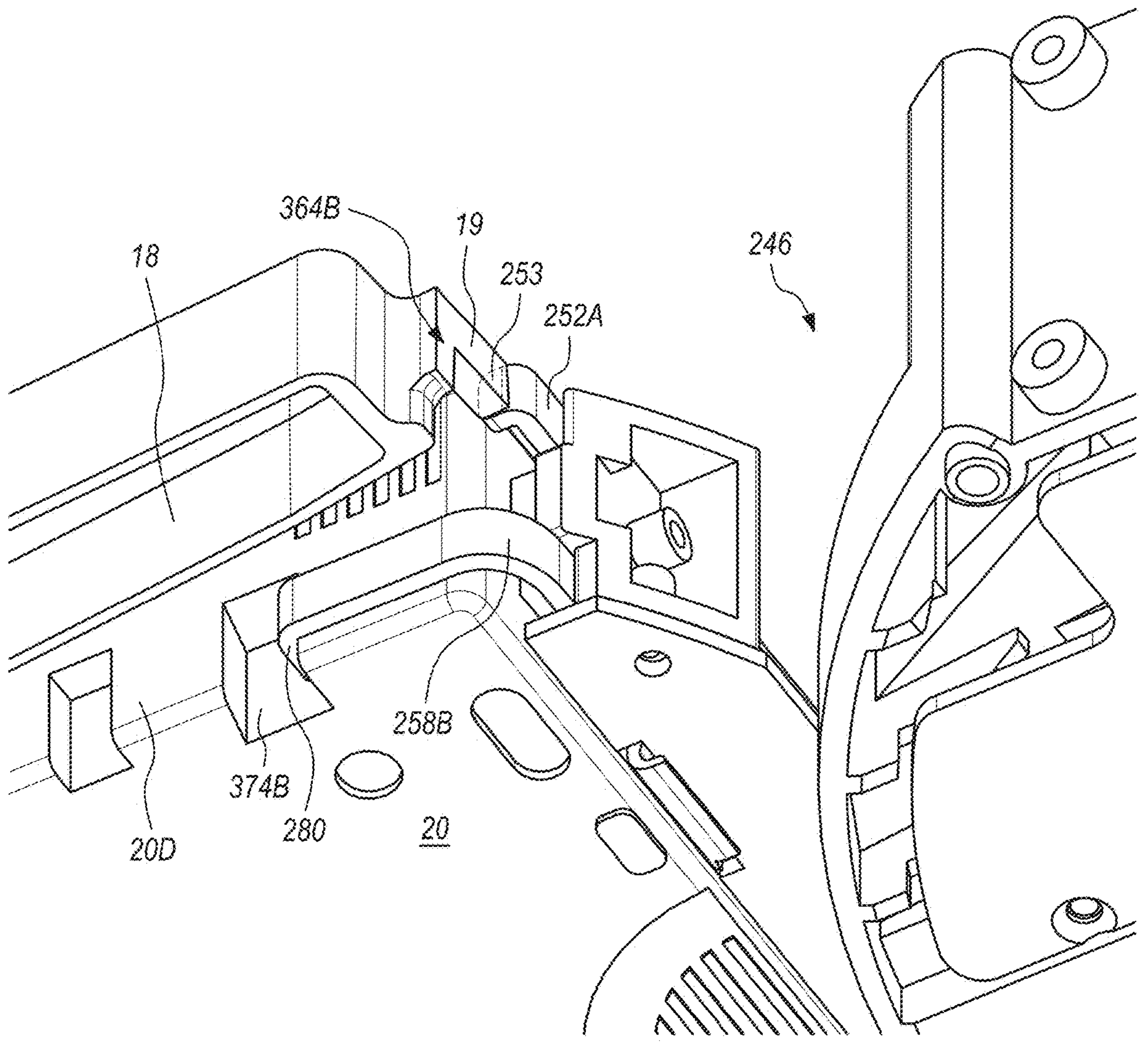
FIG. 3H is an enlarged bottom perspective view illustration of another portion of the picker system and the media cartridge of FIG. 3F.

FIG. 3H is an enlarged bottom perspective view illustration of another portion of the picker system and the media cartridge of FIG. 3F. In particular, FIG. 3H is an enlarged bottom perspective view again showing the second engaging tip 280 of the second picker finger 252B positioned substantially within and engaging the second engagement recess 374B formed into the second side 20D of the media cartridge 20.

Also shown again in FIG. 3H, the latch deactivator 253 of the first picker finger 252A has pushed and/or moved the latch 19 into the deactivated position 364B. At this time, the picker fingers 252A, 252B are actively engaged with the media cartridge 20, and the latch 19 is no longer positioned to inhibit the media cartridge 20 from being removed from within the storage slot 18. Thus, the media cartridge 20 is fully ready for removal from the storage slot 18.

Figure 3I:
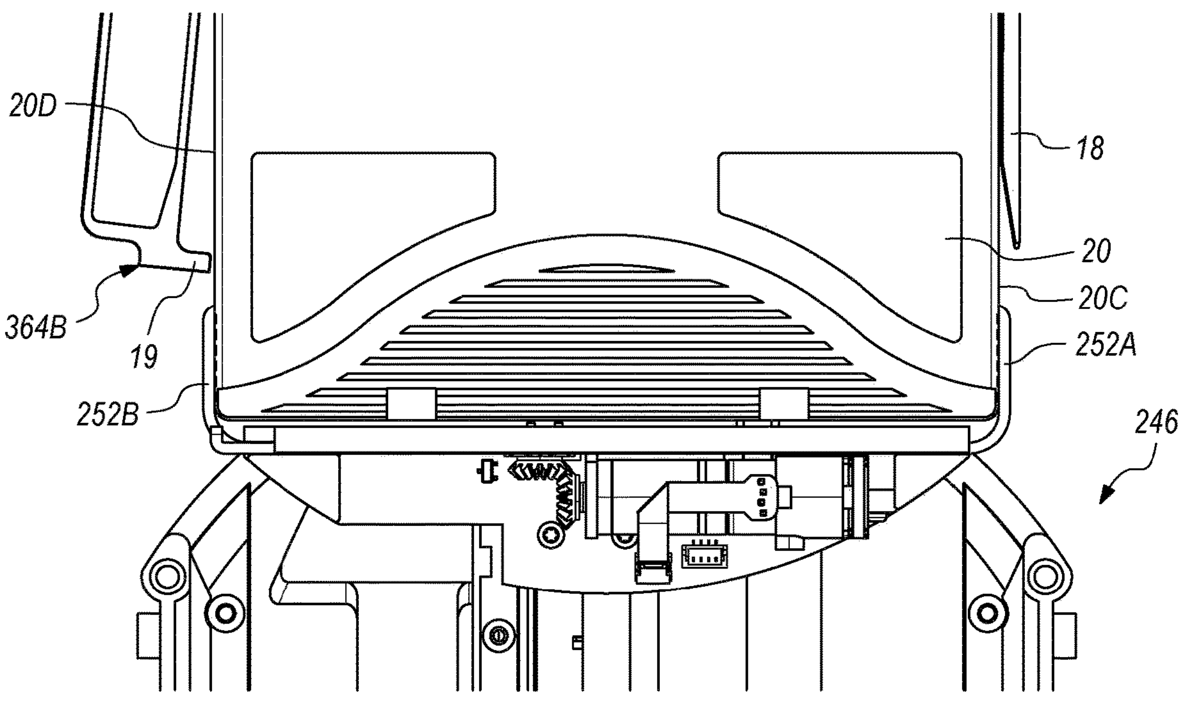
FIG. 3I is a simplified top view illustration of a fifth step of the picker system of FIG. 2 being used to access and remove the media cartridge from the storage slot of the media library.

FIG. 3I is a simplified top view illustration of a fifth step of the picker system 246 of FIG. 2 being used to access and remove the media cartridge 20 from the storage slot 18 of the media library 10 (illustrated in FIG. 1). As shown in FIG. 3I, with the latch 19 in the deactivated position 364B, and with the engaging tips 272, 280 (illustrated in FIG. 3A) of the picker fingers 252A, 252B positioned substantially within the engagement recesses 374A, 374B (illustrated in FIG. 3C) formed into the sides 20C, 20D of the media cartridge 20, the picker system 246 has begun the process of removing the media cartridge 20 from within the storage slot 18. The media cartridge 20 is shown specifically sliding by the latch 19 as the latch 19 is in the deactivated position 364B.

As noted above, in certain embodiments, the storage slots can be designed and/or configured in order to enable more than one media cartridge to be retained within the storage slot at any given time. For example, in some embodiments, the storage slot is specifically designed and/or configured to selectively receive and retain two media cartridges within the storage slot, with one media cartridge positioned behind the other within the storage slot.

FIGS. 4A-4F illustrate a step-by-step process by which a picker system 446 is usable to selectively grasp and remove a first media cartridge 420-1 from a storage slot 418, with a second media cartridge 420-2 within the storage slot 418 being simultaneously promoted toward a front 418F of the storage slot 418 as the first media cartridge 420-1 is being removed from the storage slot 418. As illustrated generally in FIGS. 4A-4F, the first media cartridge 420-1 is removed from the storage slot 418 in a manner that is substantially similar to what has been illustrated and described herein above in relation to FIGS. 3A-3I. Accordingly, all noted details of such removal of the first media cartridge 420-1 from the storage slot 418 will not be repeated in relation to FIGS. 4A-4F.

Figure 4A:
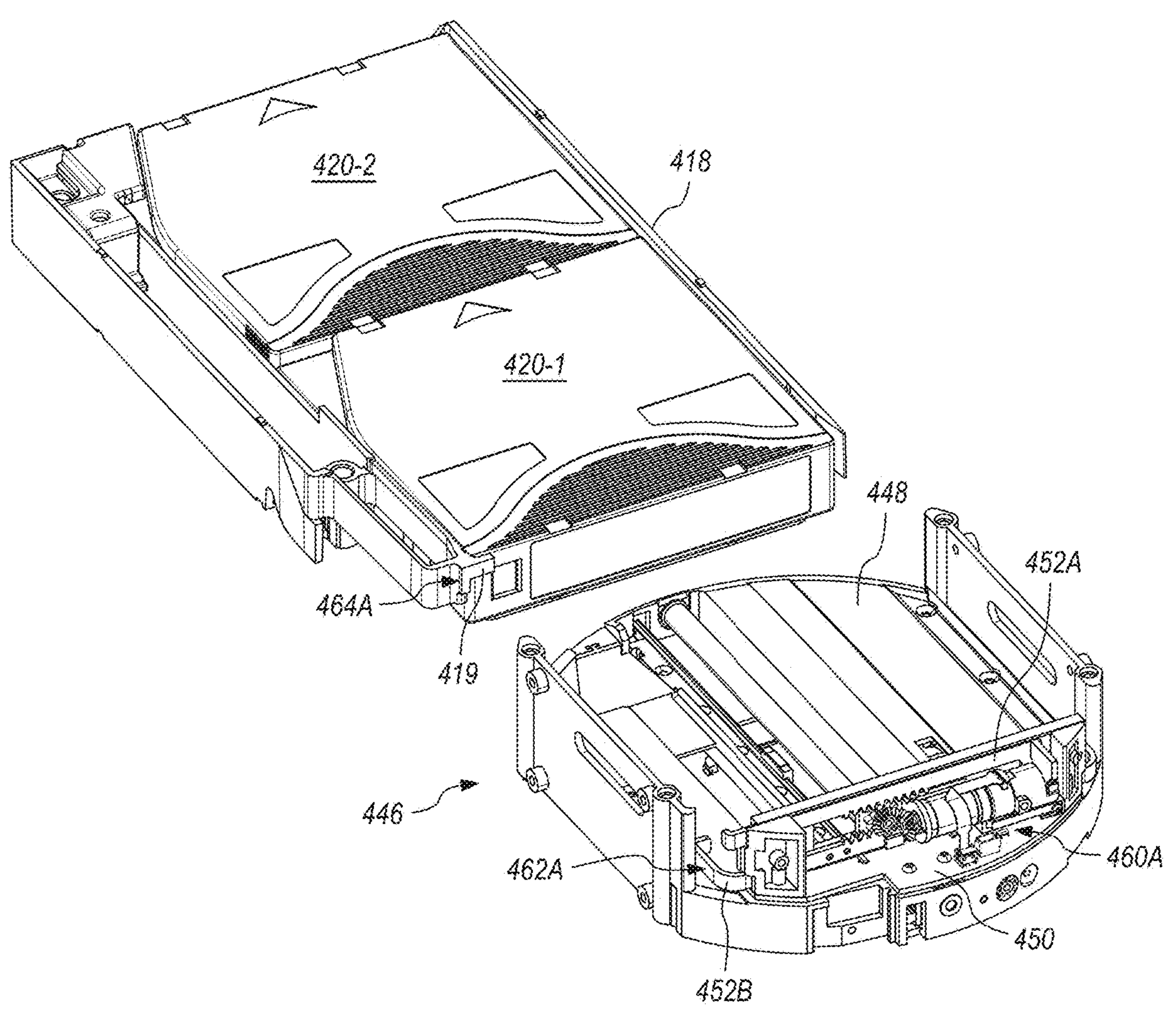
FIG. 4A is a simplified top perspective view illustration of a first step of another embodiment of the picker system being used to access and remove a first media cartridge from a storage slot of the media library that is configured to retain the first media cartridge and a second media cartridge.

FIG. 4A is a simplified top perspective view illustration of a first step of another embodiment of the picker system 446 being used to access and remove a first media cartridge 420-1 from a storage slot 418 of the media library 10 (illustrated in FIG. 1) that is configured to retain the first media cartridge 420-1 and a second media cartridge 420-2. As shown in FIG. 4A, in this embodiment, the second media cartridge 420-2 is positioned substantially directly behind the first media cartridge 420-1 within the storage slot 418, when the storage slot 418 is specifically retaining both media cartridges 420-1, 420-2.

In this first step, the picker system 446 is positioned near the storage slot 418, and the reach carriage 450 is rotationally oriented as necessary so that the picker fingers 452A, 452B can extend toward the storage slot 418 and/or the first media cartridge 420-1. As shown, in this first step, the reach carriage 450 and/or the picker fingers 452A, 452B of the picker system 446 are positioned in the retracted position 460A, with the reach carriage 450 and the picker fingers 452A, 452B being positioned substantially directly above the picker base 448; and the picker fingers 452A, 452B are further illustrated being in the first (closed) position 462A.

During this first step, the latch 419 for the storage slot 418 is shown in the activated position 464A, with the latch 419 being utilized to more securely retain the media cartridges 420-1, 420-2 within the storage slot 418.

Figure 4B:
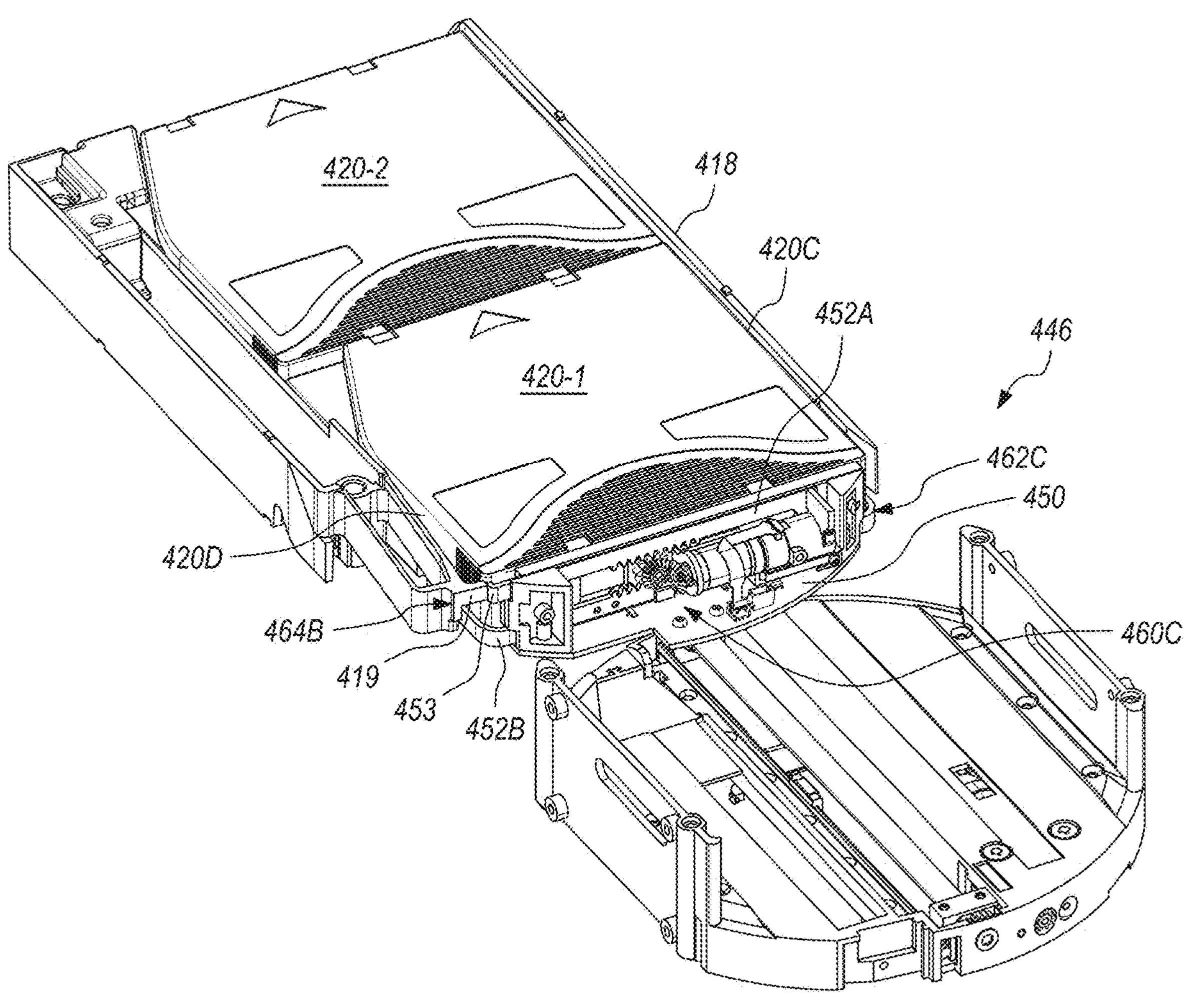
FIG. 4B is a simplified top perspective view illustration of a second step of the picker system of FIG. 4A being used to access and remove the first media cartridge from the storage slot of the media library that is configured to retain the first media cartridge and the second media cartridge.

FIG. 4B is a simplified top perspective view illustration of a second step of the picker system 446 of FIG. 4A being used to access and remove the first media cartridge 420-1 from the storage slot 418 of the media library 10 (illustrated in FIG. 1) that is configured to retain the first media cartridge 420-1 and the second media cartridge 420-2.

In this second step, the reach carriage 450 and the picker fingers 452A, 452B have been moved in a manner such as described above in FIGS. 3B, 3C and 3F, so that the picker fingers 452A, 452B are now in the second extended position 460C, and in the third (engaged) position 462C, such that the first engagement tip 272 (illustrated in FIG. 3A) is engaged with the first engagement recess 374A (illustrated in FIG. 3C) formed into the first side 420C of the first media cartridge 420-1 and the second engagement tip 280 (illustrated in FIG. 3A) is engaged with the second engagement recess 374B (illustrated in FIG. 3C) formed into the second side 420D of the first media cartridge 420-1.

As further shown in FIG. 4B, during such movement to the third (engaged) position 462C, the latch deactivator 453, as coupled to, secured to, and/or integrally formed with the first picker finger 452A, simultaneously pushes and/or moves the latch 419 that is coupled to the storage slot 418 from the activated position 464A (illustrated in FIG. 4A) to the deactivated position 464B. With the latch 419 now being in the deactivated position 464B, the latch 419 is no longer positioned to inhibit the first media cartridge 420-1 from being removed from within the storage slot 418.

Figure 4C:
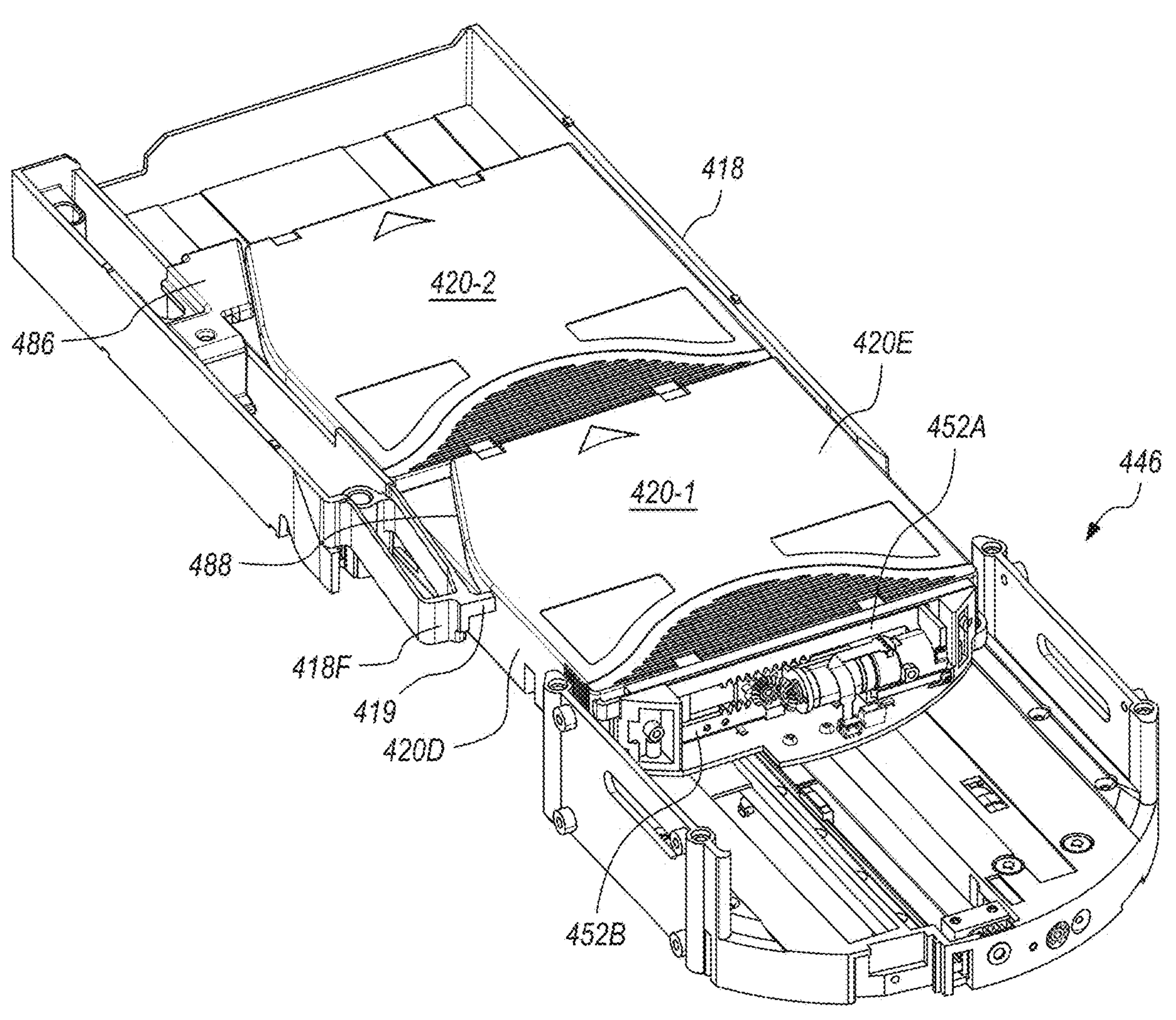
FIG. 4C is a simplified top perspective view illustration of a third step of the picker system of FIG. 4A being used to access and remove the first media cartridge from the storage slot of the media library that is configured to retain the first media cartridge and the second media cartridge.

FIG. 4C is a simplified top perspective view illustration of a third step of the picker system 446 of FIG. 4A being used to access and remove the first media cartridge 420-1 from the storage slot 418 of the media library 10 (illustrated in FIG. 1) that is configured to retain the first media cartridge 420-1 and the second media cartridge 420-2. As illustrated, in this third step, the picker system 446 and/or the picker fingers 452A, 452B are being used to start removing the first media cartridge 420-1 from the storage slot 418. At this point in the removal process, the latch 419 is being guided along a guide surface 488 that extends downward from the top surface 420E of the first media cartridge 420-1 and/or along a portion of the second side 420D of the first media cartridge 420-1.

As also shown in this third step, the storage slot 418 further includes a cartridge promoter 486 that pushes the second media cartridge 420-2 toward a front 418F of the storage slot 418 as the first media cartridge 420-1 is being removed from the storage slot 418.

Figure 4D:
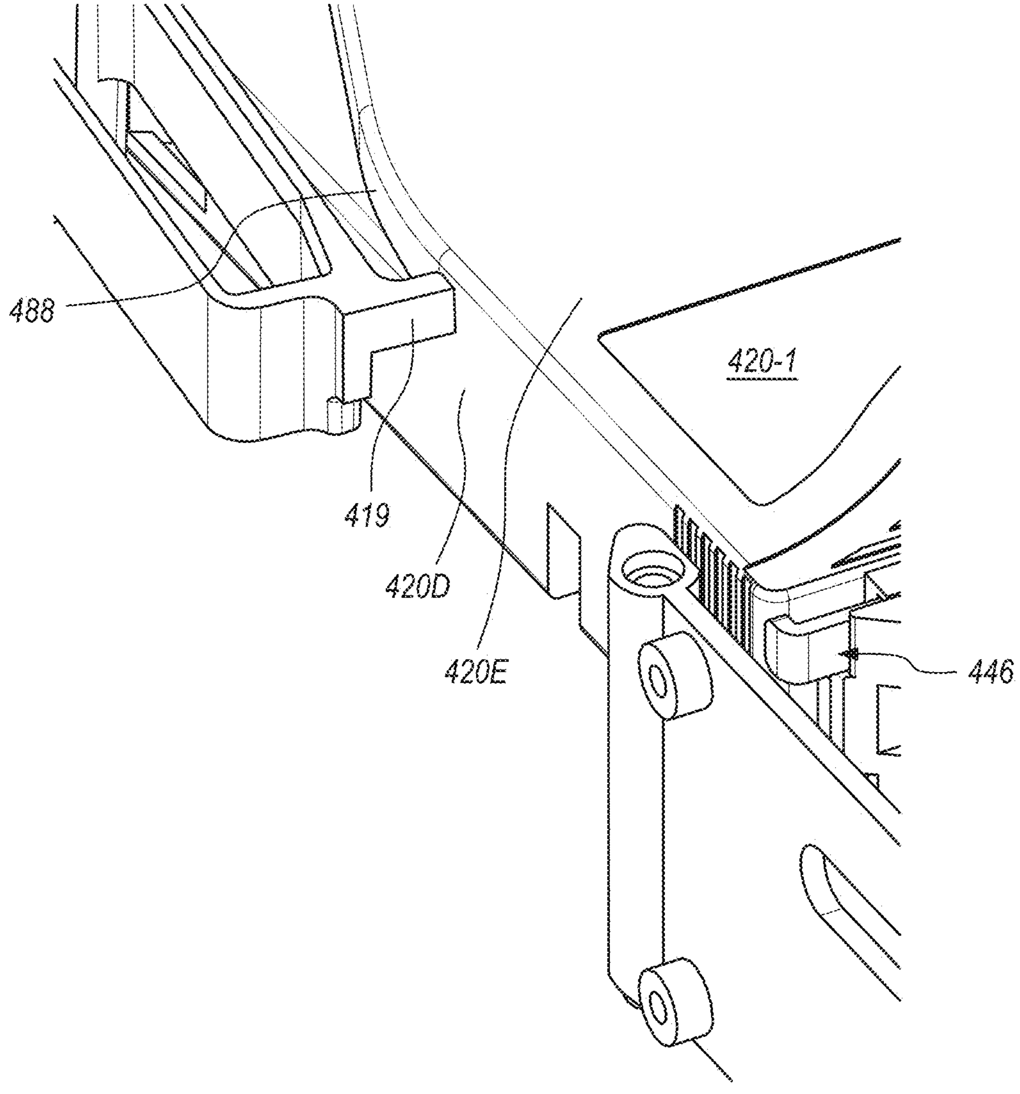
FIG. 4D is an enlarged top perspective view illustration of a portion of the picker system and the first media cartridge of FIG. 4C.

FIG. 4D is an enlarged top perspective view illustration of a portion of the picker system 446 and the first media cartridge 420-1 of FIG. 4C. In particular, as noted above, at this point in the removal process for the first media cartridge 420-1, the latch 419 is being guided along the guide surface 488 that extends downward from the top surface 420E of the first media cartridge 420-1 and/or along a portion of the second side 420D of the first media cartridge 420-1.

Figure 4E:
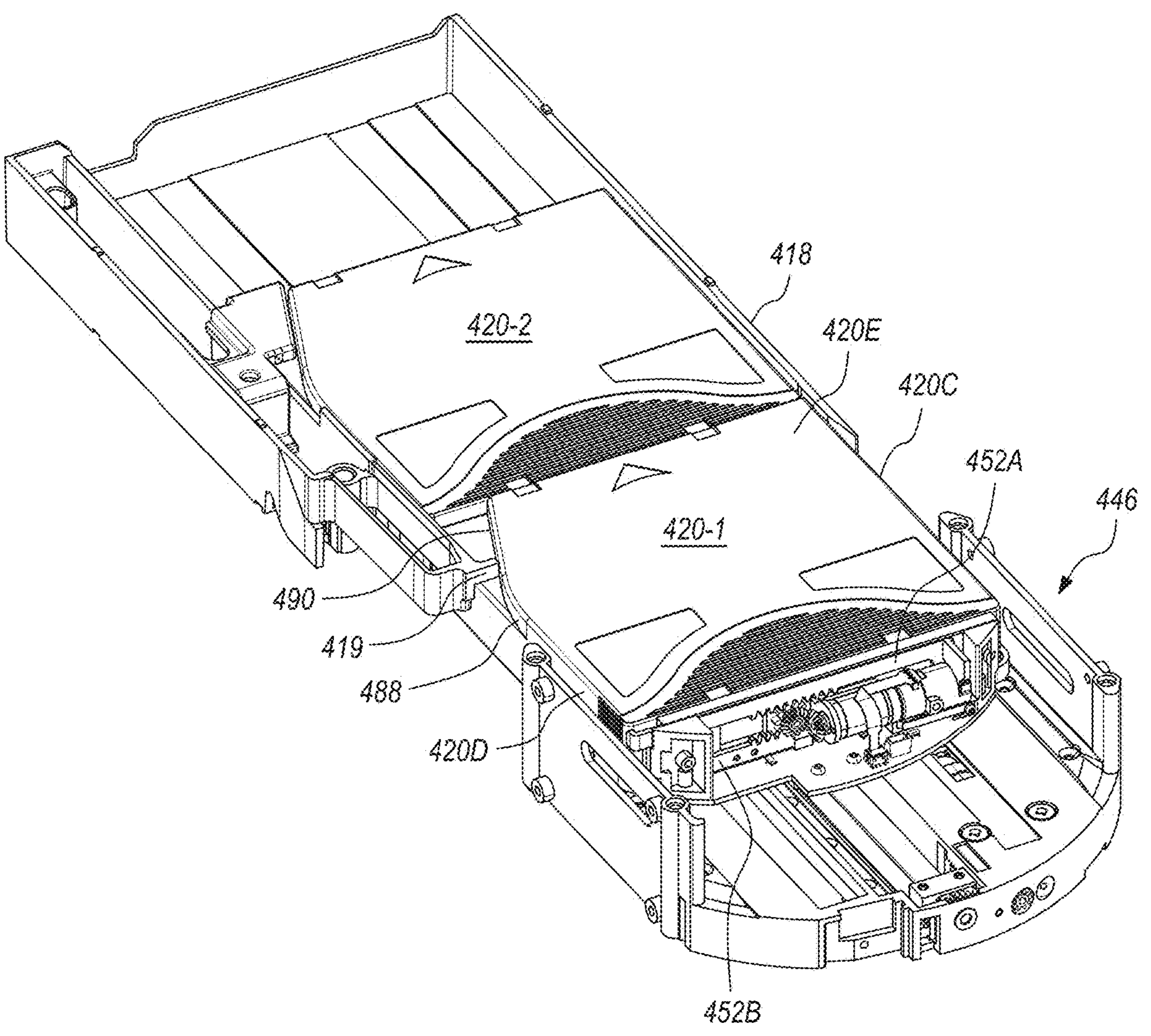
FIG. 4E is a simplified top perspective view illustration of a fourth step of the picker system of FIG. 4A being used to access and remove the first media cartridge from the storage slot of the media library that is configured to retain the first media cartridge and the second media cartridge.

FIG. 4E is a simplified top perspective view illustration of a fourth step of the picker system 446 of FIG. 4A being used to access and remove the first media cartridge 420-1 from the storage slot 418 of the media library 10 (illustrated in FIG. 1) that is configured to retain the first media cartridge 420-1 and the second media cartridge 420-2.

In this fourth step, the picker fingers 452A, 452B are still engaged with the engagement recesses 374A, 374B (illustrated in FIG. 3C) formed into the first side 420C and the second side 420D of the first media cartridge 420-1, and the first media cartridge 420-1 is further along during the removal process. As shown, the latch 419 is now being guided along an angled portion 490 of the guide surface 488 that extends downward from the top surface 420E of the first media cartridge 420-1 and/or along a portion of the second side 420D of the first media cartridge 420-1. As the first media cartridge 420-1 is further removed from the storage slot 418, and the latch 419 is guided along the angled portion 490 of the guide surface 488, the latch 419 moves back toward the activated position 464A (illustrated in FIG. 4A), as there is no longer the same force that moved it to the deactivated position 464B (illustrated in FIG. 4B) and/or maintained it in the deactivated position 464B.

It is further appreciated that the angled portion 490 of the guide surface 488 plays an important role as a media cartridge is being moved into the storage slot 418. More specifically, as the media cartridge is moved into the storage slot 418, the latch 419 will move along the angled portion 490 of the guide surface 488 such that the angled portion 490 of the guide surface 488 will gradually move the latch 419 from the activated position 464A into the deactivated position 464B. Thus, the media cartridge can be quickly and easily received and retained within the storage slot 418.

Figure 4F:
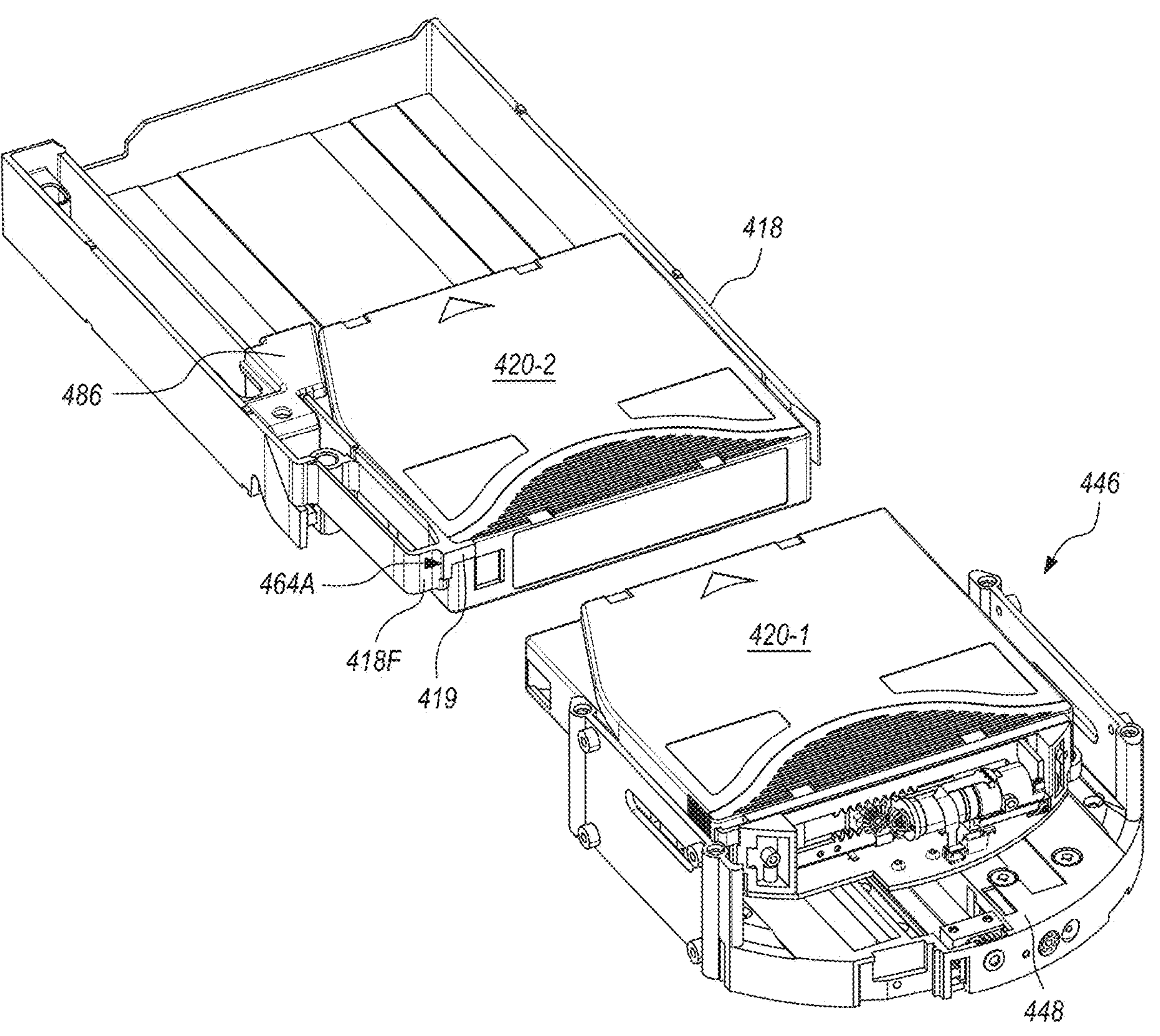
FIG. 4F is a simplified top perspective view illustration of a fifth step of the picker system of FIG. 4A being used to access and remove the first media cartridge from the storage slot of the media library that is configured to retain the first media cartridge and the second media cartridge.

FIG. 4F is a simplified top perspective view illustration of a fifth step of the picker system 446 of FIG. 4A being used to access and remove the first media cartridge 420-1 from the storage slot 418 of the media library 10 (illustrated in FIG. 1) that is configured to retain the first media cartridge 420-1 and the second media cartridge 420-2. As illustrated, in this fifth step, the first media cartridge 420-1 has been fully removed from the storage slot 418 and is now being held and supported on the picker base 448.

Also shown in FIG. 4F, in this fifth step, the cartridge promoter 486 has pushed and/or moved the second media cartridge 420-2 all the way to the front 418F of the storage slot 418. However, of further note, with the latch 419 having moved back to the activated position 464A, the latch 419 now is helping to securely retain the second media cartridge 420-2 in the storage slot 418.

FIG. 5 is a simplified top perspective view illustration of a portion of the picker system 246 of FIG. 2 and a media cartridge 20, with the picker system 246 being used in a push mode. In particular, as shown, the picker fingers 252A, 252B have been moved to the fourth (push) position 562D, so that movement of the picker fingers 252A, 252B from the first extended position 360B (illustrated in FIG. 3B) toward the second extended position 360C (illustrated in FIG. 3C) will tend to push the media cartridge 20, such that the media cartridge 20 can be fully positioned within the desired storage slot 18 (illustrated in FIG. 1) or within the desired media drive 26 (illustrated in FIG. 1). More specifically, with the picker fingers 252A, 252B in the first extended position 360B and in the fourth (push) position 562D, such that the lateral spread 366 of the picker fingers 252A, 252B is less that the width 20W of the media cartridge 20, the engagement tip 272, 280 of each of the picker fingers 252A, 252B can contact the rear 20B of the media cartridge 20. Thus, movement of the picker fingers 252A, 252B from the first extended position 360B toward the second extended position 360C can push the media cartridge 20, such that the media cartridge 20 can be fully positioned within the desired storage slot 18 or within the desired media drive 26.

It is understood that although a number of different embodiments of the media library, the retrieval assembly and/or the picker system have been illustrated and described herein, one or more features of any one embodiment can be combined with one or more features of one or more of the other embodiments, provided that such combination satisfies the intent of the present invention.

While a number of exemplary aspects and embodiments of the media library, the retrieval assembly and/or the picker system have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A media library including a media cartridge, the media library comprising:

a storage slot that is configured to selectively receive and retain the media cartridge, the storage slot including a latch that is configured to securely retain the media cartridge within the storage slot; and a picker system that is configured to selectively retrieve the media cartridge from within the storage slot, the picker system including a first picker finger, an opposed second picker finger, and a latch deactivator that is configured to selectively move the latch between an activated position in which the latch inhibits the media cartridge from being removed from the storage slot, and a deactivated position in which the latch does not inhibit the media cartridge from being removed from the storage slot, the latch deactivator being coupled to the first picker finger so that movement of the first picker finger results in corresponding movement of the latch deactivator.

2. The media library of claim 1 wherein the latch deactivator is integrally formed with the first picker finger.

3. The media library of claim 1 wherein the latch deactivator is coupled to the first picker finger such that movement of the first picker finger in a first direction results in corresponding movement of the latch deactivator in the first direction.

4. The media library of claim 1 wherein the media cartridge includes a first side and an opposed second side; wherein the first picker finger has a first engaging tip that is configured to selectively engage the first side of the media cartridge; wherein the second picker finger has a second engaging tip that is configured to selectively engage the second side of the media cartridge, the picker fingers being movable between an open position in which the picker fingers do not engage the sides of the media cartridge, and an engaged position in which the picker fingers do engage the sides of the media cartridge; and wherein the latch deactivator is configured to move the latch from the activated position to the deactivated position simultaneously as the picker fingers are moved from the open position to the engaged position.

5. The media library of claim 4 wherein the first side of the media cartridge includes a first engagement recess; wherein the second side of the media cartridge includes a second engagement recess; and wherein the first engaging tip engages the first engagement recess and the second engaging tip engages the second engagement recess when the picker fingers are in the engaged position.

6. The media library of claim 4 wherein the picker system further includes a reach carriage, the picker fingers being coupled to the reach carriage; wherein the reach carriage and the picker fingers are selectively movable relative to the media cartridge between a retracted position, a first extended position and a second extended position; and wherein the reach carriage does not move relative to the media cartridge as the picker fingers are moved from the open position to the engaged position and as the latch is moved by the latch deactivator from the activated position to the deactivated position.

7. The media library of claim 1 wherein the first picker finger includes a first base section that extends substantially parallel to a rear of the media cartridge when the picker system is being utilized to selectively retrieve the media cartridge from within the storage slot, the first base section including a first segment and a second segment that are at different heights relative to the storage slot, and a stepped segment that is coupled to and extends between the first segment and the second segment.

8. The media library of claim 7 wherein the first segment and the second segment are configured to extend substantially horizontally; and wherein the stepped segment extends substantially vertically between the first segment and the second segment.

9. The media library of claim 7 wherein the latch deactivator is coupled to the first segment; and wherein the first picker finger further includes a first intermediate section that is coupled to the second segment, and a first engaging tip that is coupled to the first intermediate section, the first engaging tip being configured to selectively engage a first side of the media cartridge.

10. The media library of claim 9 wherein the second picker finger includes (i) a second base section that extends substantially parallel to the rear of the media cartridge when the picker system is being utilized to selectively retrieve the media cartridge from within the storage slot, (ii) a second intermediate section that is coupled to a distal end of the second base section, and (iii) a second engaging tip that is coupled to the second intermediate section, the second engaging tip being configured to selectively engage a second side of the media cartridge.

11. The media library of claim 10 wherein the first segment of the first base section of the first picker finger is movingly coupled to a first portion of a rotating gear; wherein the second base section of the second picker finger is movingly coupled to a second portion of the rotating gear; and wherein rotation of the rotating gear causes the first picker finger to move in a first direction, and simultaneously causes the second picker finger to move in a second direction that is opposite to the first direction.

12. The media library of claim 11 wherein the picker system further includes a finger motor that is coupled to the rotating gear, the finger motor being configured to rotate the rotating gear so that the picker fingers move between an open position in which the picker fingers do not engage the sides of the media cartridge, and an engaged position in which the picker fingers do engage the sides of the media cartridge.

13. The media library of claim 12 wherein the finger motor is coupled to and rotates a first beveled gear; wherein the first beveled gear engages a second beveled gear such that rotation of the first beveled gear causes a corresponding rotation of the second beveled gear; and wherein the second beveled gear is coupled to the rotating gear such that rotation of the second beveled gear causes rotation of the rotating gear.

14. A media library including a media cartridge including a first side, and an opposed second side, the media library comprising:

a storage slot that is configured to selectively receive and retain the media cartridge, the storage slot including a latch that is movable between an activated position in which the latch inhibits the media cartridge from being removed from the storage slot, and a deactivated position in which the latch does not inhibit the media cartridge from being removed from the storage slot; and a picker system that is configured to selectively retrieve the media cartridge from within the storage slot, the picker system including (i) a first picker finger having a first engaging tip that is configured to selectively engage the first side of the media cartridge, (ii) an opposed second picker finger having a second engaging tip that is configured to selectively engage the second side of the media cartridge, the picker fingers being movable between an open position in which the picker fingers do not engage the sides of the media cartridge, and an engaged position in which the picker fingers do engage the sides of the media cartridge, and (iii) a latch deactivator that is integrally formed with the first picker finger, the latch deactivator being configured to move the latch from the activated position to the deactivated position simultaneously as the picker fingers are moved from the open position to the engaged position.

15. The media library of claim 14 wherein the first side of the media cartridge includes a first engagement recess; wherein the second side of the media cartridge includes a second engagement recess; and wherein the first engaging tip engages the first engagement recess and the second engaging tip engages the second engagement recess when the picker fingers are in the engaged position.

16. The media library of claim 14 wherein the first picker finger includes a first base section that extends substantially parallel to a rear of the media cartridge when the picker system is being utilized to selectively retrieve the media cartridge from within the storage slot, the first base section including a first segment and a second segment that are at different heights relative to the storage slot, and a stepped segment that is coupled to and extends between the first segment and the second segment.

17. The media library of claim 16 wherein the latch deactivator is coupled to the first segment; and wherein the first picker finger further includes a first intermediate section that is coupled to the second segment, the first engaging tip being coupled to the first intermediate section.

18. The media library of claim 17 wherein the second picker finger further includes (i) a second base section that extends substantially parallel to the rear of the media cartridge when the picker system is being utilized to selectively retrieve the media cartridge from within the storage slot, and (ii) a second intermediate section that is coupled to a distal end of the second base section, the second engaging tip being coupled to the second intermediate section.

19. The media library of claim 18 wherein the first segment of the first base section of the first picker finger is movingly coupled to a first portion of a rotating gear; wherein the second base section of the second picker finger is movingly coupled to a second portion of the rotating gear; and wherein rotation of the rotating gear causes the first picker finger to move in a first direction, and simultaneously causes the second picker finger to move in a second direction that is opposite to the first direction; and wherein the picker system further includes a finger motor that is coupled to the rotating gear, the finger motor being configured to rotate the rotating gear so that the picker fingers move between the open position and the engaged position.

20. A media library including a media cartridge including a first side, and an opposed second side, the media library comprising:

a storage slot that is configured to selectively receive and retain the media cartridge, the storage slot including a latch that is movable between an activated position in which the latch inhibits the media cartridge from being removed from the storage slot, and a deactivated position in which the latch does not inhibit the media cartridge from being removed from the storage slot; and a picker system that is configured to selectively retrieve the media cartridge from within the storage slot, the picker system including (i) a first picker finger including a first base section that extends substantially parallel to a rear of the media cartridge when the picker system is being utilized to selectively retrieve the media cartridge from within the storage slot, the first base section including a first segment and a second segment that are at different heights relative to the storage slot, and a stepped segment that is coupled to and extends between the first segment and the second segment, a first intermediate section that is coupled to the second segment, and a first engaging tip that is coupled to the first intermediate section, the first engaging tip being configured to selectively engage a first side of the media cartridge; (ii) an opposed second picker finger including a second base section that extends substantially parallel to the rear of the media cartridge when the picker system is being utilized to selectively retrieve the media cartridge from within the storage slot, a second intermediate section that is coupled to a distal end of the second base section, and a second engaging tip that is coupled to the second intermediate section, the second engaging tip being configured to selectively engage a second side of the media cartridge, the picker fingers being movable between an open position in which the picker fingers do not engage the sides of the media cartridge, and an engaged position in which the picker fingers do engage the sides of the media cartridge; and (iii) a latch deactivator that is integrally formed with the first picker finger, the latch deactivator being configured to move the latch from the activated position to the deactivated position simultaneously as the picker fingers are moved from the open position to the engaged position;

wherein the first segment of the first base section of the first picker finger is movingly coupled to a first portion of a rotating gear;

wherein the second base section of the second picker finger is movingly coupled to a second portion of the rotating gear; and wherein rotation of the rotating gear causes the picker fingers to move between the open position and the engaged position.

* * * * *